United States Patent
Calley et al.

(10) Patent No.: US 8,415,848 B2
(45) Date of Patent: *Apr. 9, 2013

(54) TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING

(75) Inventors: David G. Calley, Flagstaff, AZ (US); Daniel S Cole, Flagstaff, AZ (US); John M. Dyer, Flagstaff, AZ (US); Thomas F. Janecek, Flagstaff, AZ (US)

(73) Assignee: Electric Torque Machines, Inc., Flagstaff, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,896

(22) Filed: Oct. 12, 2011

(65) Prior Publication Data
US 2012/0025637 A1  Feb. 2, 2012

Related U.S. Application Data

(63) Continuation of application No. 12/772,958, filed on May 3, 2010, now Pat. No. 8,053, 944.

(60) Provisional application No. 61/314,118, filed on Mar. 15, 2010.

(51) Int. Cl.
*H02K 1/06* (2006.01)
*H02K 21/12* (2006.01)

(52) U.S. Cl. ...... 310/156.02; 310/216.023; 310/216.033; 310/181; 310/208; 310/267

(58) Field of Classification Search ............ 310/156.02, 310/216.033, 216.023, 201, 181, 208, 267
See application file for complete search history.

(56) References Cited

U.S. PATENT DOCUMENTS

| | | | |
|---|---|---|---|
| 1,361,136 | A | 12/1920 | Burke |
| 2,078,668 | A | 4/1937 | Kilgore |
| 2,122,307 | A | 6/1938 | Welch |
| 3,403,273 | A | 9/1968 | Hiroshi |

(Continued)

FOREIGN PATENT DOCUMENTS

| | | |
|---|---|---|
| DE | 1513856 | 4/1969 |
| DE | 3626149 | 8/1986 |

(Continued)

OTHER PUBLICATIONS

Notice of Allowance dated Mar. 29, 2005 for U.S. Appl. No. 10/721,765.

(Continued)

*Primary Examiner* — Tran Nguyen
*Assistant Examiner* — Alex W Mok
(74) *Attorney, Agent, or Firm* — Pillsbury Winthrop Shaw Pittman LLP

(57) ABSTRACT

Electrical machines, for example transverse flux machines and/or commutated flux machines, may be configured to achieve increased efficiency, increased output torque, and/or reduced operating losses via use of extended magnets, overhung rotors, and/or stator tooth overlap. Extended magnets may reduce flux leakage between adjacent flux concentrators. Overhung rotors may reduce flux leakage, and may also facilitate voltage balancing in polyphase devices. Stator tooth overlap may reduce hysteresis losses, for example losses in flux concentrating portions of an electrical machine.

20 Claims, 18 Drawing Sheets

U.S. PATENT DOCUMENTS

| | | |
|---|---|---|
| 3,437,854 A | 4/1969 | Oiso |
| 3,558,941 A | 1/1971 | Visconti Brebbia et al. |
| 3,700,942 A | 10/1972 | Alth |
| 3,710,158 A | 1/1973 | Bachle et al. |
| 3,774,059 A | 11/1973 | Cox |
| 4,021,691 A | 5/1977 | Dukshtau et al. |
| 4,114,057 A | 9/1978 | Esters |
| 4,206,374 A | 6/1980 | Goddijn |
| 4,237,396 A | 12/1980 | Blenkinsop et al. |
| 4,237,397 A | 12/1980 | Mohr et al. |
| 4,255,684 A | 3/1981 | Mischler et al. |
| 4,363,988 A | 12/1982 | Kliman |
| 4,388,545 A | 6/1983 | Honsinger et al. |
| 4,392,072 A | 7/1983 | Rosenberry |
| 4,459,501 A | 7/1984 | Fawzy |
| 4,501,980 A | 2/1985 | Welburn |
| 4,605,874 A | 8/1986 | Whiteley |
| 4,611,139 A | 9/1986 | Godkin et al. |
| 4,620,752 A | 11/1986 | Fremerey et al. |
| 4,658,166 A | 4/1987 | Oudet |
| 4,704,555 A | 11/1987 | Stokes |
| 4,794,286 A | 12/1988 | Taenzer |
| 4,797,602 A | 1/1989 | West |
| 4,801,834 A | 1/1989 | Stokes |
| 4,835,840 A | 6/1989 | Stokes |
| 4,850,100 A | 7/1989 | Stokes |
| 4,900,965 A | 2/1990 | Fisher |
| 4,959,577 A | 9/1990 | Radomski |
| 5,038,066 A | 8/1991 | Pawlak et al. |
| 5,051,641 A | 9/1991 | Weh |
| 5,097,167 A | 3/1992 | Kanayama et al. |
| 5,117,142 A | 5/1992 | von Zweygbergk |
| 5,130,595 A | 7/1992 | Arora |
| 5,132,581 A | 7/1992 | Kusase |
| 5,177,054 A | 1/1993 | Lloyd |
| 5,195,231 A | 3/1993 | Fanning et al. |
| 5,208,503 A | 5/1993 | Hisey |
| 5,212,419 A | 5/1993 | Fisher et al. |
| 5,250,865 A | 10/1993 | Meeks |
| 5,262,746 A | 11/1993 | Masuda |
| 5,278,470 A | 1/1994 | Neag |
| 5,289,072 A | 2/1994 | Lange |
| 5,306,977 A | 4/1994 | Hayashi |
| 5,362,222 A * | 11/1994 | Faig et al. .................. 425/145 |
| 5,382,859 A | 1/1995 | Huang et al. |
| 5,386,166 A | 1/1995 | Reimer et al. |
| 5,530,308 A | 6/1996 | Fanning et al. |
| 5,543,674 A | 8/1996 | Koehler |
| 5,543,677 A | 8/1996 | Fakler |
| 5,633,551 A | 5/1997 | Weh |
| 5,650,680 A | 7/1997 | Chula |
| 5,712,521 A | 1/1998 | Detela |
| 5,717,262 A | 2/1998 | Muller |
| 5,726,514 A | 3/1998 | Wurz et al. |
| 5,729,065 A | 3/1998 | Fremery et al. |
| 5,731,649 A | 3/1998 | Caamano |
| 5,773,910 A | 6/1998 | Lange |
| 5,777,418 A | 7/1998 | Lange et al. |
| 5,780,953 A | 7/1998 | Umeda et al. |
| 5,814,907 A | 9/1998 | Bandera |
| 5,886,449 A | 3/1999 | Mitcham |
| 5,889,348 A | 3/1999 | Muhlberger et al. |
| 5,894,183 A | 4/1999 | Borchert |
| 5,925,965 A | 7/1999 | Li et al. |
| 5,942,828 A | 8/1999 | Hill |
| 5,973,436 A | 10/1999 | Mitcham |
| 5,994,802 A | 11/1999 | Shichijyo et al. |
| 6,028,377 A | 2/2000 | Sakamoto |
| 6,043,579 A | 3/2000 | Hill |
| 6,060,810 A | 5/2000 | Lee et al. |
| 6,066,906 A | 5/2000 | Kalsi |
| 6,097,126 A | 8/2000 | Takura |
| 6,121,712 A | 9/2000 | Sakamoto |
| 6,133,655 A | 10/2000 | Suzuki et al. |
| 6,133,669 A | 10/2000 | Tupper |
| 6,137,202 A | 10/2000 | Holmes et al. |
| 6,154,013 A | 11/2000 | Caamano |
| 6,163,097 A | 12/2000 | Smith et al. |
| 6,177,748 B1 | 1/2001 | Katcher et al. |
| 6,181,035 B1 | 1/2001 | Acquaviva |
| 6,194,799 B1 | 2/2001 | Miekka |
| 6,229,238 B1 | 5/2001 | Graef |
| 6,232,693 B1 | 5/2001 | Gierer et al. |
| 6,236,131 B1 | 5/2001 | Schafer |
| 6,300,702 B1 | 10/2001 | Jack et al. |
| 6,333,582 B1 | 12/2001 | Asao |
| 6,365,999 B1 | 4/2002 | Muhlberger et al. |
| 6,445,105 B1 | 9/2002 | Kliman et al. |
| 6,448,687 B2 | 9/2002 | Higashino et al. |
| 6,455,970 B1 | 9/2002 | Shafer et al. |
| 6,472,792 B1 | 10/2002 | Jack et al. |
| 6,492,758 B1 | 12/2002 | Gianni et al. |
| 6,545,382 B1 | 4/2003 | Bennett |
| 6,603,060 B1 | 8/2003 | Ohashi et al. |
| 6,603,237 B1 | 8/2003 | Caamano |
| 6,657,329 B2 | 12/2003 | Kastinger et al. |
| 6,664,704 B2 | 12/2003 | Calley |
| 6,707,208 B2 | 3/2004 | Durham et al. |
| 6,717,297 B2 | 4/2004 | Sadarangani et al. |
| 6,774,512 B2 | 8/2004 | Takagi et al. |
| 6,794,791 B2 | 9/2004 | Ben Ahmed et al. |
| 6,815,863 B1 | 11/2004 | Jack et al. |
| 6,849,985 B2 | 2/2005 | Jack et al. |
| 6,853,112 B2 | 2/2005 | Nakamura et al. |
| 6,867,530 B2 | 3/2005 | Gamm et al. |
| 6,879,080 B2 | 4/2005 | Caamano |
| 6,885,129 B1 | 4/2005 | Oohashi et al. |
| 6,888,272 B2 | 5/2005 | Kastinger |
| 6,924,579 B2 | 8/2005 | Calley |
| 6,940,197 B2 | 9/2005 | Fujita et al. |
| 6,949,855 B2 | 9/2005 | Dubois et al. |
| 6,979,925 B2 | 12/2005 | Schwamm |
| 6,989,622 B1 | 1/2006 | Chen et al. |
| 7,015,603 B2 | 3/2006 | Barrho et al. |
| 7,026,737 B2 | 4/2006 | Angerer et al. |
| 7,030,529 B2 | 4/2006 | Dommsch et al. |
| 7,030,534 B2 | 4/2006 | Caamano |
| 7,064,469 B2 | 6/2006 | Jack et al. |
| 7,067,954 B2 | 6/2006 | Kuribayashi et al. |
| 7,071,593 B2 | 7/2006 | Matsushita et al. |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,230,361 B2 | 6/2007 | Hirzel |
| 7,245,055 B2 | 7/2007 | Jack |
| 7,250,704 B1 | 7/2007 | Sortore et al. |
| 7,358,639 B2 | 4/2008 | Caamano |
| 7,385,329 B2 | 6/2008 | Hill |
| 7,385,330 B2 | 6/2008 | Trzynadlowski et al. |
| 7,420,312 B2 | 9/2008 | Kitamura et al. |
| 7,466,057 B2 | 12/2008 | Imai et al. |
| 7,592,735 B2 | 9/2009 | Hamada |
| 7,602,095 B2 | 10/2009 | Kusase |
| 8,053,944 B2 * | 11/2011 | Calley et al. ............ 310/216.033 |
| 2001/0001528 A1 | 5/2001 | Ragaly |
| 2001/0030479 A1 | 10/2001 | Mohler |
| 2001/0030486 A1 | 10/2001 | Pijanowski |
| 2001/0030487 A1 | 10/2001 | Higashino |
| 2002/0070627 A1 | 6/2002 | Ward et al. |
| 2002/0135242 A1 | 9/2002 | Kawai |
| 2002/0171315 A1 | 11/2002 | Kastinger |
| 2003/0122439 A1 | 7/2003 | Horst |
| 2003/0122440 A1 | 7/2003 | Horst |
| 2003/0122442 A1 | 7/2003 | Jack et al. |
| 2004/0027021 A1 | 2/2004 | Karrelmeyer |
| 2004/0046478 A1 | 3/2004 | Zierer et al. |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0212267 A1 | 10/2004 | Jack et al. |
| 2004/0232793 A1 | 11/2004 | Fujita et al. |
| 2004/0232799 A1 | 11/2004 | Chen et al. |
| 2004/0251759 A1 | 12/2004 | Hirzel |

| | | |
|---|---|---|
| 2004/0251761 A1 | 12/2004 | Hirzel |
| 2004/0262105 A1 | 12/2004 | Li et al. |
| 2005/0006978 A1 | 1/2005 | Bradfield |
| 2005/0012427 A1 | 1/2005 | Seki et al. |
| 2005/0062348 A1 | 3/2005 | Ohnishi et al. |
| 2005/0088056 A1 | 4/2005 | Kuribayashi |
| 2005/0121983 A1 | 6/2005 | Ehrhart |
| 2005/0156479 A1 | 7/2005 | Fujita et al. |
| 2005/0156480 A1 | 7/2005 | Imai |
| 2005/0242679 A1 | 11/2005 | Walter et al. |
| 2006/0012259 A1 | 1/2006 | Kerlin |
| 2006/0012263 A1 | 1/2006 | Smith et al. |
| 2006/0055280 A1 | 3/2006 | Isoda |
| 2006/0082237 A1 | 4/2006 | Kerlin |
| 2006/0087180 A1 | 4/2006 | Woo et al. |
| 2006/0091755 A1 | 5/2006 | Carlisle et al. |
| 2006/0131974 A1 | 6/2006 | Sadarangani et al. |
| 2006/0131986 A1 | 6/2006 | Hsu et al. |
| 2006/0186754 A1 | 8/2006 | Kitamura et al. |
| 2006/0192453 A1 | 8/2006 | Gieras et al. |
| 2006/0220477 A1 | 10/2006 | Okumoto et al. |
| 2006/0261688 A1 | 11/2006 | Akita et al. |
| 2007/0013253 A1 | 1/2007 | Dubois et al. |
| 2007/0046137 A1 | 3/2007 | Ooiwa |
| 2007/0046139 A1 | 3/2007 | Ishizuka |
| 2007/0075605 A1 | 4/2007 | Enomoto et al. |
| 2007/0138900 A1 | 6/2007 | Imai et al. |
| 2007/0152528 A1 | 7/2007 | Kang et al. |
| 2007/0176505 A1 | 8/2007 | Trzynadlowski et al. |
| 2008/0007126 A1 | 1/2008 | Popov et al. |
| 2008/0169776 A1 | 7/2008 | Acker |
| 2008/0211326 A1 | 9/2008 | Kang et al. |
| 2008/0265707 A1 | 10/2008 | Bradfield |
| 2008/0309188 A1 | 12/2008 | Calley |
| 2008/0315700 A1 | 12/2008 | Ishikawa et al. |
| 2009/0026866 A1 | 1/2009 | Groening et al. |
| 2009/0243406 A1 | 10/2009 | Jack et al. |
| 2011/0025140 A1 | 2/2011 | Pennander et al. |
| 2011/0025141 A1 | 2/2011 | Nord et al. |
| 2011/0037329 A1 | 2/2011 | Nord et al. |

FOREIGN PATENT DOCUMENTS

| | | |
|---|---|---|
| DE | 3602687 | 8/1987 |
| DE | 8711725 | 8/1987 |
| DE | 3904516 | 6/1990 |
| DE | 3927453 | 2/1991 |
| DE | 19639670 | 4/1998 |
| DE | 19634949 | 5/1998 |
| DE | 19650572 | 6/1998 |
| DE | 19753261 | 6/1998 |
| DE | 19753320 | 6/1998 |
| DE | 199650697 | 6/1998 |
| DE | 19704392 | 8/1998 |
| DE | 19743906 | 4/1999 |
| DE | 19960737 | 7/2001 |
| DE | 10047675 | 4/2002 |
| DE | 10053265 | 5/2002 |
| DE | 10062073 | 6/2002 |
| DE | 10128646 | 1/2003 |
| DE | 10130702 | 1/2003 |
| DE | 10145820 | 4/2003 |
| DE | 102006026719 | 6/2006 |
| DE | 102005020952 | 11/2006 |
| DE | 102007018930 | 10/2008 |
| DE | 102008054381 | 6/2010 |
| DE | 102009060955 | 7/2011 |
| DE | 102009060956 | 7/2011 |
| DE | 102009060959 | 7/2011 |
| EP | 0544200 | 11/1992 |
| EP | 0707374 | 4/1996 |
| EP | 0718959 | 6/1996 |
| EP | 0796758 | 9/1997 |
| EP | 0833429 | 4/1998 |
| EP | 0998010 | 3/2000 |
| EP | 1063754 | 12/2000 |
| EP | 1117168 | 7/2001 |
| EP | 1227566 | 7/2002 |
| GB | 518298 | 9/1938 |
| GB | 2052176 | 1/1986 |
| JP | 60241758 | 11/1985 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | WO 2009116935 | 9/2009 |
| WO | WO 2009116936 | 9/2009 |
| WO | WO 2009116937 | 9/2009 |

OTHER PUBLICATIONS

Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
ISR/WO dated Aug. 15, 2008 for International Patent Application No. PCT/US2008/063301.
IPRP dated Nov. 10, 2009 for International Patent Application No. PCT/US2008/063301.
ISR/WO dated Aug. 20, 2008 for International Patent Application No. PCT/US2008/063236.
IPRP dated Nov. 17, 2009 for International Patent Application No. PCT/US2008/063236.
ISR/WO dated Oct. 24, 2008 for International Patent Application No. PCT/US2008/063336.
IPRP dated Nov. 17, 2009 for International Patent Application No. PCT/US2008/063336.
ISR/WO dated Aug. 15, 2008 for International Patent Application No. PCT/US2008/063287.
IPRP dated Nov. 10, 2009 for International Patent Application No. PCT/US2008/063287.
ISR/WO dated Nov. 10, 2009 for International Patent Application No. PCT/US2008/063268.
IPRP dated Nov. 10, 2009 for International Patent Application No. PCT/US2008/063268.
Technical Project Presentation—Development of a High-Performance Generator for Wind Turbines—by Andrzej M. Trzynadlowski, PhD, University of Nevada, Reno, FIEEE.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method", by Y.G. Guo et al., Faculty of Engineering, University of Technology, Sydney.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University.
"Permanent Magnet Assisted Synchronous Reluctance Motor Design and Performance Improvement",—A Dissertation by Peyman Niazi, Texas A&M University, Dec. 2005.
"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.
"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.

Dubois, Maxine R. et al.; "Clawpole Transverse-Flux Machine with Hybrid Stator"; pp. 1-6.

Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.

Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.

Husband, S.M. et al.; "The Rolls-Royce Transverse Flux Motor Development"; Electric Machines and Drives Conference, vol. 3, pp. 1435-1440, IEEE, 2003.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2., Jun. 2006.

Fundamental Modeling for Optimal Design of Transverse Flux Motors—Genevieve Patterson et al., University of Tokyo.

www.higenmotor.com/eng/aboutus/about06read.asp?id=notice&no=87 dated Jan. 15, 2010.

Lyng Eltorque QT 800—2.0 User Manual, version 1.0—dated Jul. 3, 2007.

Motors: Emerging Concepts by George Holling, Apr. 2007.

www.iem.rwth-aachen.de/index.pl/new materials and machines?makePrintable=1; retrieved Jan. 15, 2010.

Raser Technologies Company Brochure.

Response to Office Action filed Jan. 15, 2010 for Japanese Patent Application No. JPPA-2003-548374.

Office Action dated Mar. 2, 2010 for U.S. Appl. No. 12/149,931.

Restriction Requirement dated Apr. 5, 2010 for U.S. Appl. No. 12/149,934.

Restriction Requirement dated Apr. 22, 2010 for U.S. Appl. No. 12/149,936.

Office Action dated Apr. 28, 2010 for U.S. Appl. No. 12/149,935.

Notice of Allowance dated May 4, 2010 for U.S. Appl. No. 12/149,931.

Office Action dated Aug. 9, 2010 for U.S. Appl. No. 12/611,733.

Notice of Allowance dated Aug. 12, 2010 for U.S. Appl. No. 12/611,728.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

ISR and WO dated Jun. 10, 2010 for International Application No. PCT/US2009/063145.

ISR and WO dated Jun. 10, 2010 for International Application No. PCT/US2009/063142.

ISR and WO dated Jun. 18, 2010 for International Application No. PCT/US2009/063147.

Office Action dated May 19, 2010 for U.S. Appl. No. 12/149,934.

Office Action dated Jul. 27, 2010 for U.S. Appl. No. 12/149,936.

* cited by examiner

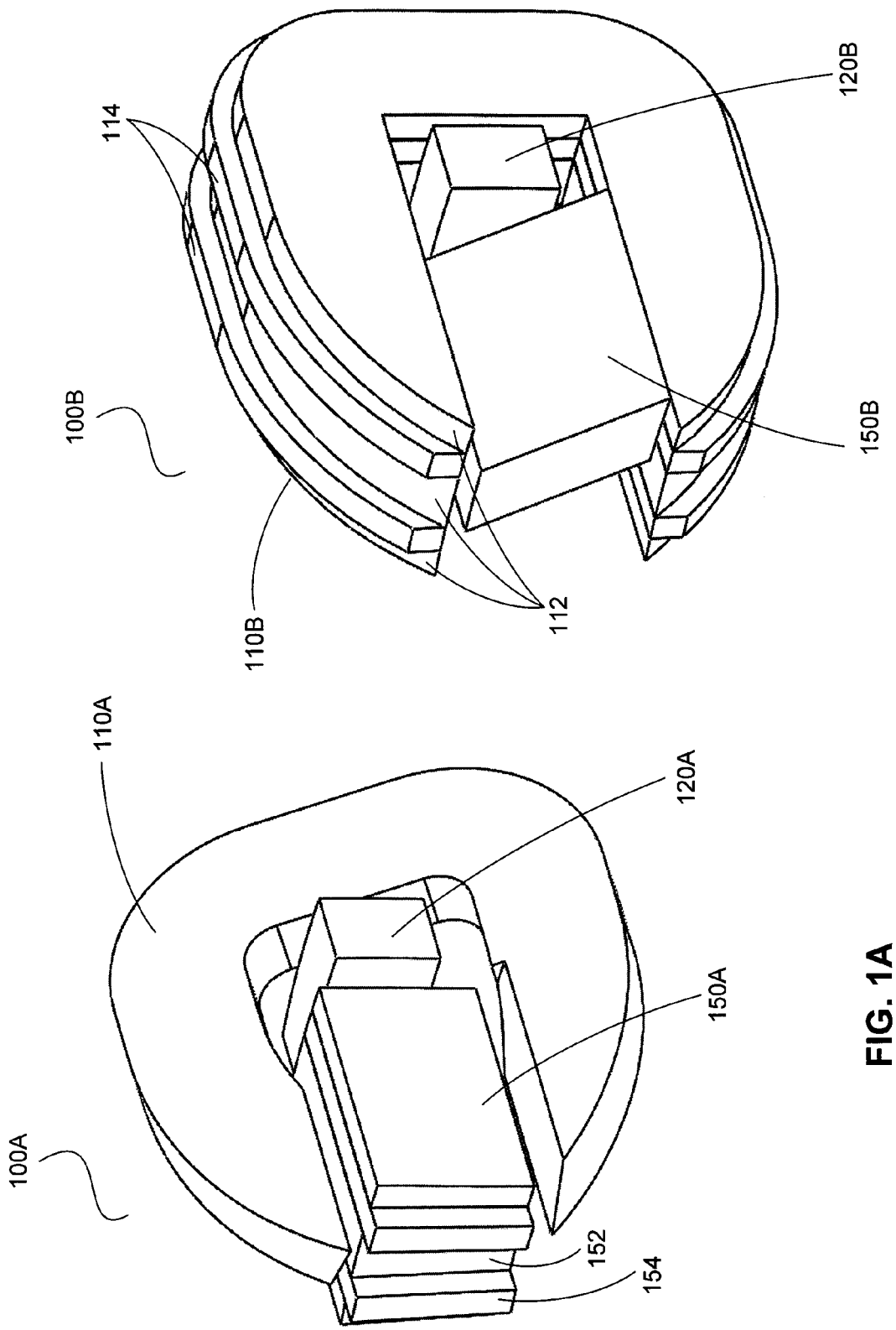

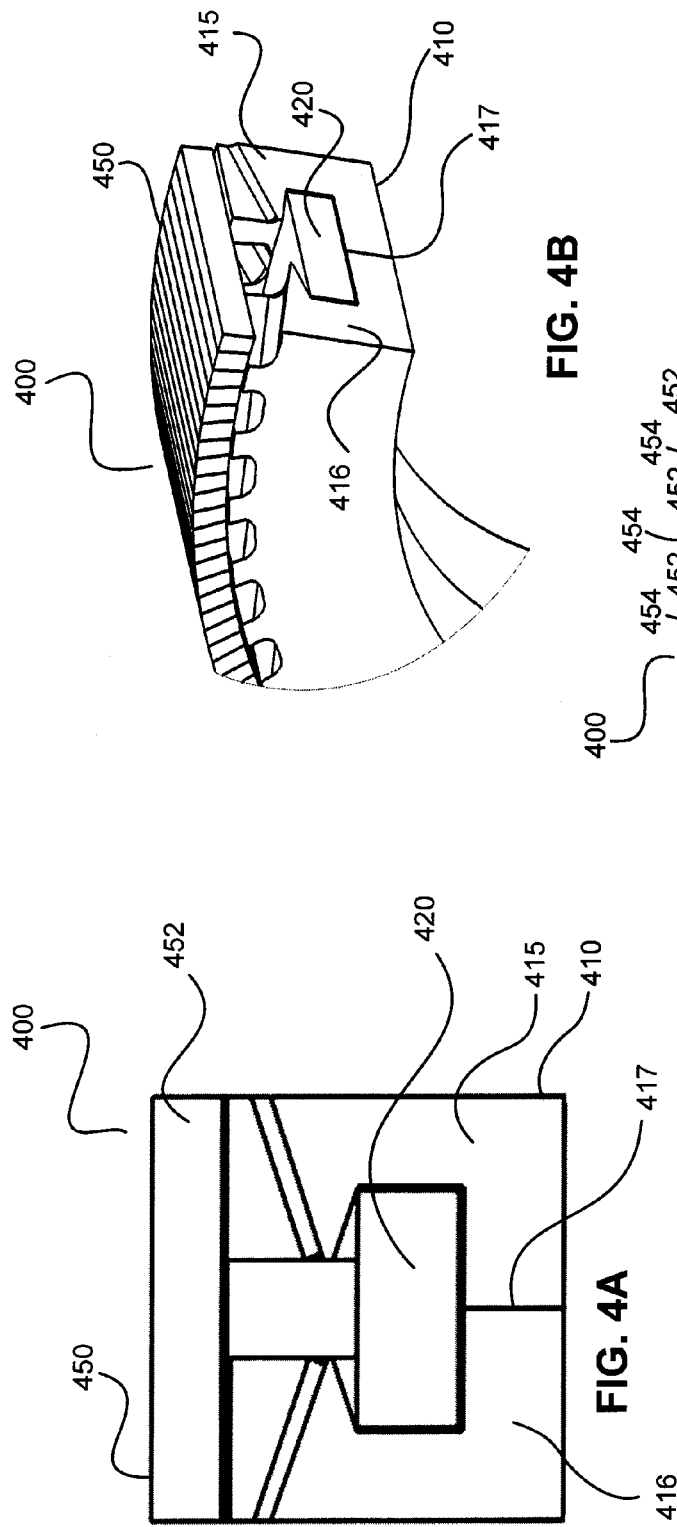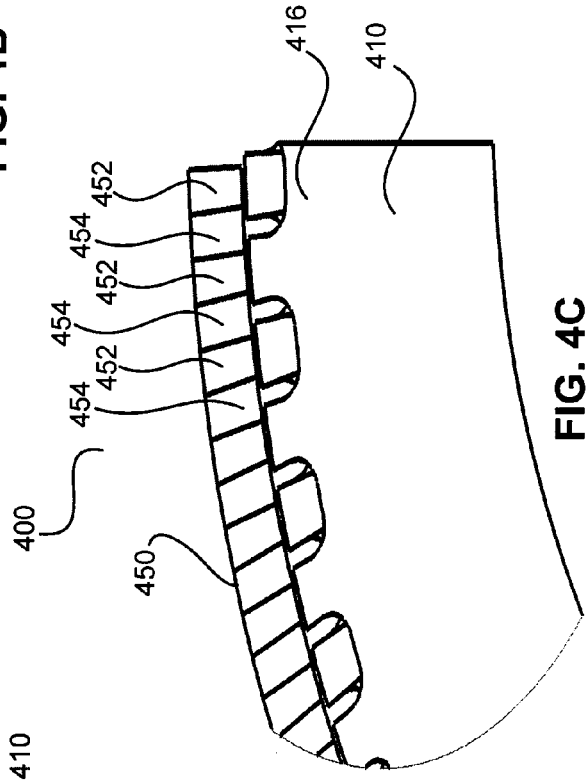

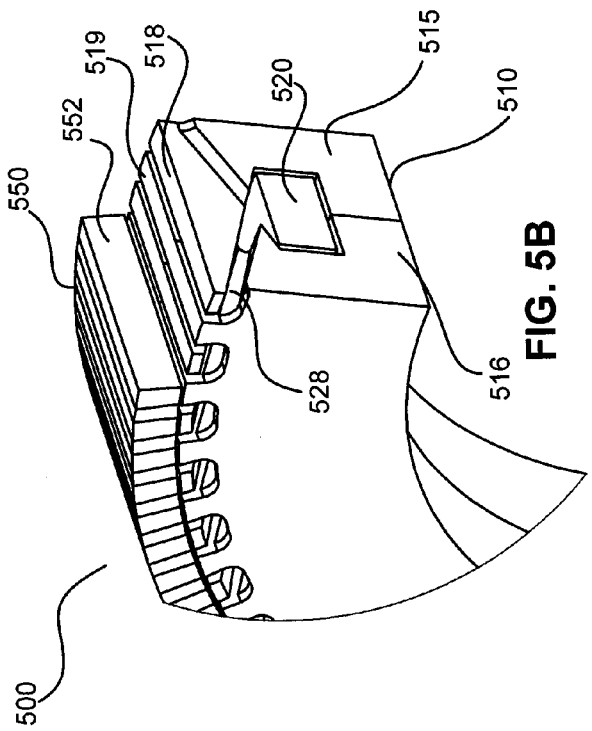
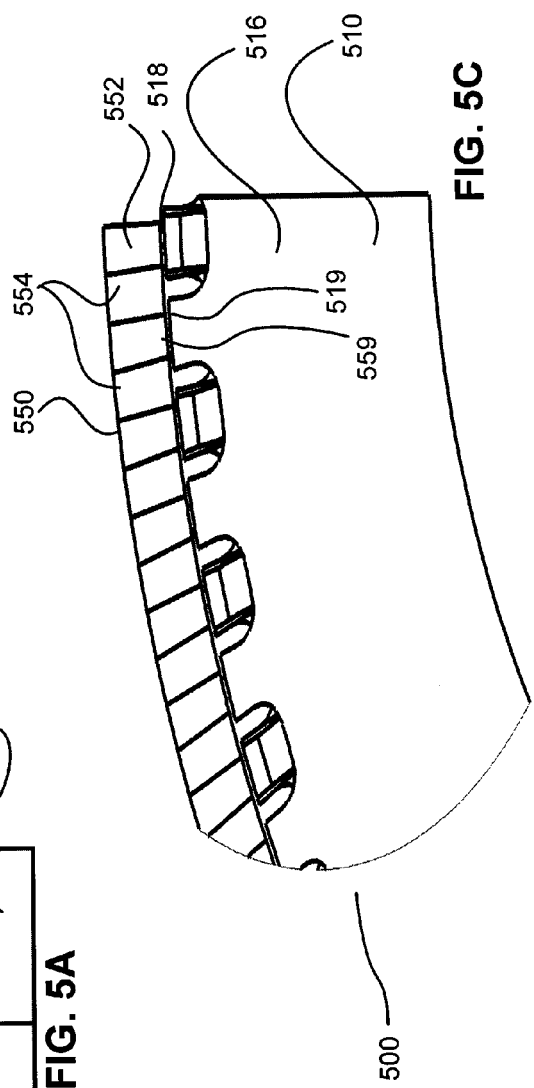
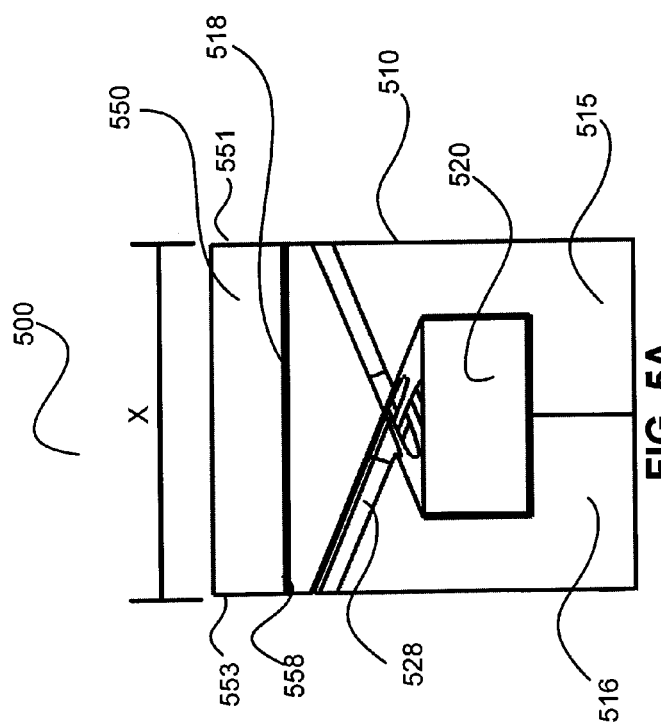
FIG. 5A
FIG. 5B
FIG. 5C

Position 2

Position 1

Position 2

Position 1

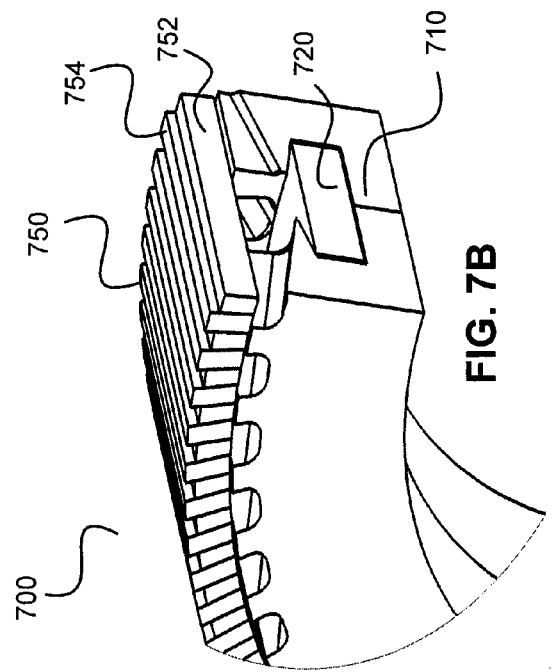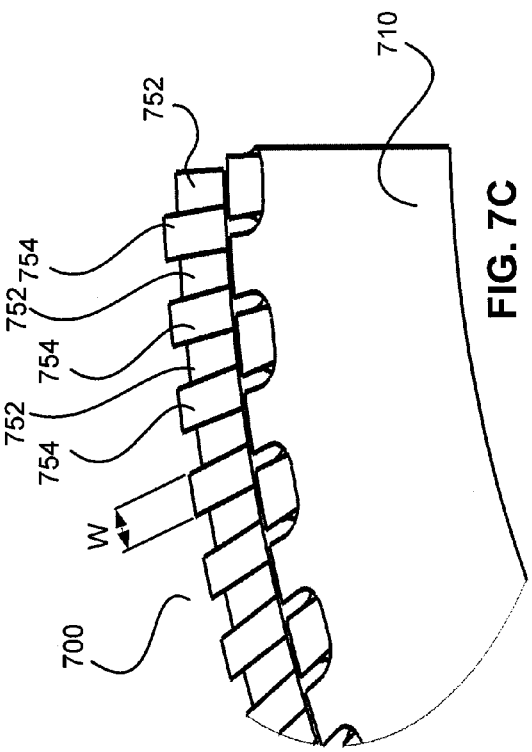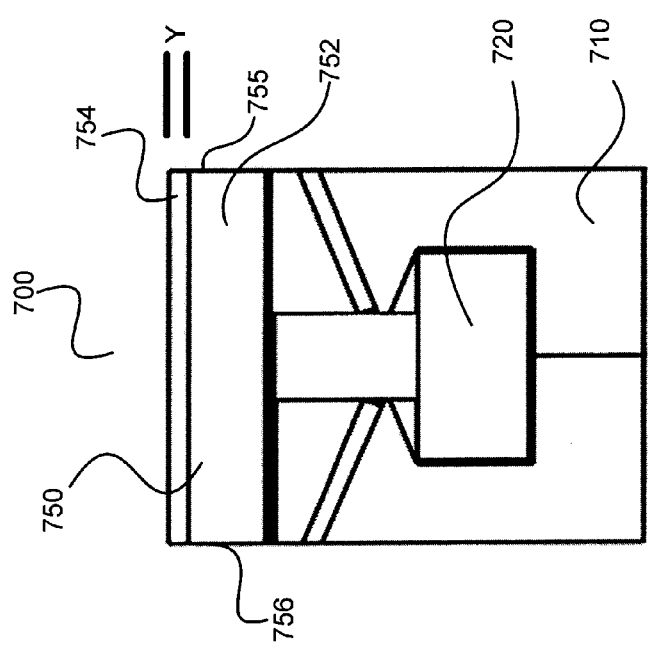

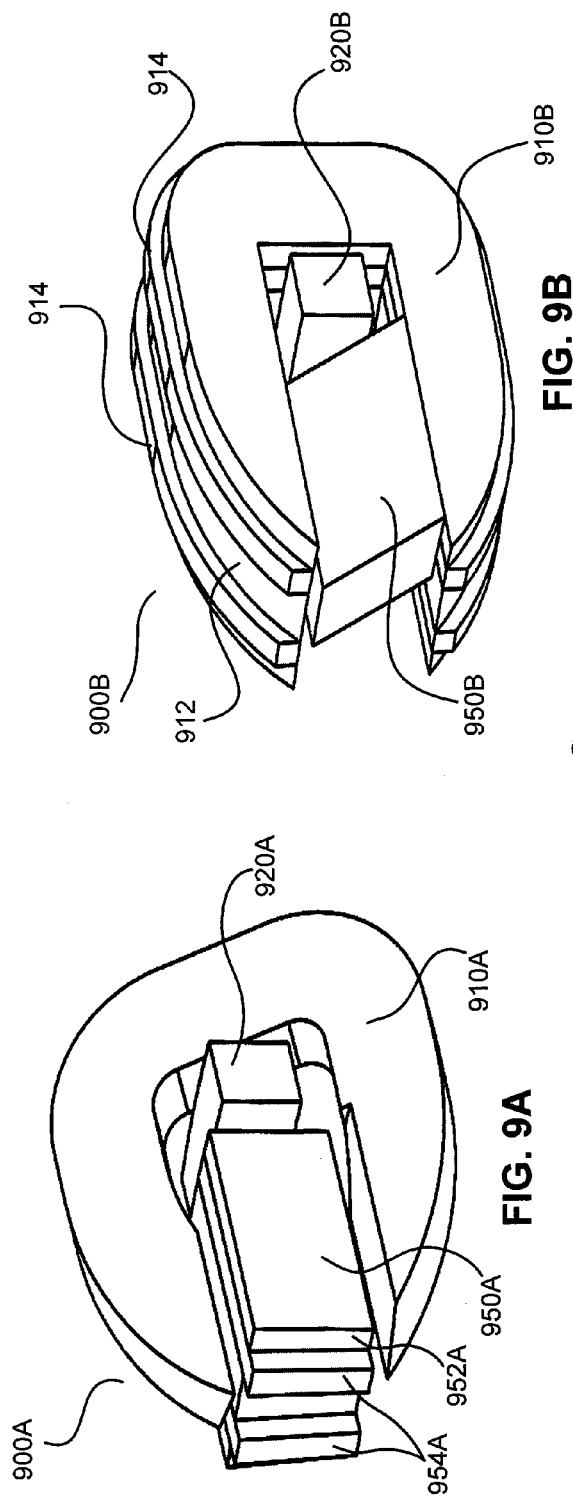
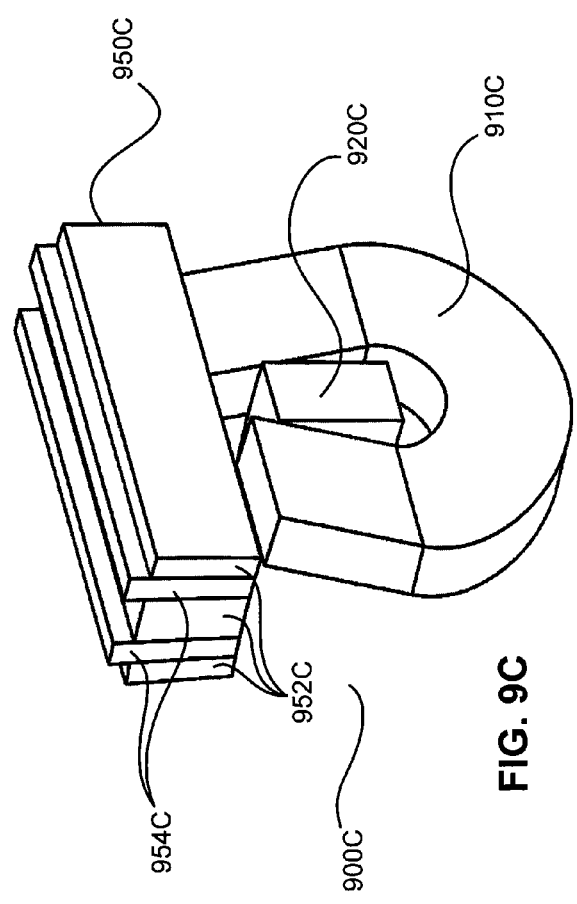
FIG. 9B
FIG. 9A
FIG. 9C

TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING

CROSS REFERENCE TO RELATED APPLICATIONS

This application is a continuation of U.S. Ser. No. 12/772,958 filed on May 3, 2010, now U.S. patent application publication No. 2011/0169365 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING". U.S. Ser. No. 12/772,958 is a non-provisional of U.S. Provisional No. 61/314,118 filed on Mar. 15, 2010 and entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING." The entire contents of each of the foregoing applications are hereby incorporated by reference.

TECHNICAL FIELD

The present disclosure relates to electrical machines, and in particular to transverse flux machines and commutated flux machines.

BACKGROUND

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require complex winding geometry and often complex winding machines in order to meet size and/or power needs. As the number of poles increases, the winding problem is typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability. In particular, improved transverse flux machines and/or commutated flux machines are desirable, for example because they are especially suitable for high pole counts without increasing coil losses or increasing the complexity of the winding geometry.

SUMMARY

This disclosure relates to transverse flux machines and/or commutated flux machines. In an exemplary embodiment, an electrical machine, comprises a rotor, a stator, and a coil, wherein the rotor rotates about a rotational axis and interacts with the stator at a switch interface. The rotor and coil function in combination to cause flux to flow around the coil in first and second opposite directions. The electrical machine comprises a plurality of flux concentrators that are interleaved adjacent and between a plurality of magnets. The plurality of magnets is extended in a direction away from the coil to a distance greater than an adjacent flux concentrator of the plurality of flux concentrators. At least a portion of the rotor overhangs the stator on at least one of a distinct first side of the stator, a distinct second side of the stator, or both the distinct first side of the stator and the distinct second side of the stator. In a first position of the rotor, flux is transferred from a switching surface of the rotor to at least one of a first plurality of stator teeth along substantially the entire length of a switching surface of the rotor. In a second position of the rotor, flux is transferred from the switching surface of the rotor to at least one of a second plurality of stator teeth along substantially the entire length of the switching surface of the rotor. The flux flow in the flux concentrator corresponding to the switching surface of the rotor is substantially in the same direction in the first position of the rotor as in the second position. The electrical machine is at least one of a transverse flux machine or a commutated flux machine.

In another exemplary embodiment, an electrical machine comprises: a coil, and a plurality of magnets interleaved with a plurality of flux concentrators. The plurality of flux concentrators are configured to transfer flux at a switch interface. At least one of the plurality of magnets is extended in a direction away from the coil to a distance greater than an adjacent flux concentrator of the plurality of flux concentrators in order to reduce flux leakage from the adjacent flux concentrator. The electrical machine is at least one of a transverse flux machine or a commutated flux machine.

In another exemplary embodiment, an electrical machine comprises: a coil, a stator comprising a plurality of flux switches, and a rotor comprising a plurality of magnets interleaved with a plurality of flux concentrators. The rotor overhangs the stator on a first side of the stator and a second side of the stator in a direction parallel to an air gap between the rotor and the stator. The electrical machine is at least one of a transverse flux machine or a commutated flux machine.

In another exemplary embodiment, an electrical machine comprises a coil, a rotor comprising a plurality of magnets interleaved with a plurality of flux concentrators, and a stator. The stator comprises a first set of stator teeth, and a second set of stator teeth interleaved with the first set of stator teeth. In a first position of the rotor, flux is transferred from one of the plurality of flux concentrators to one of the first set of stator teeth along a portion of the flux concentrator having a length L. In the second position of the rotor, flux is transferred from the one of the plurality of flux concentrators to one of the second set of stator teeth along the portion of the flux concentrator having the length L.

The contents of this summary section are provided only as a simplified introduction to the disclosure, and are not intended to be used to limit the scope of the appended claims.

BRIEF DESCRIPTION OF THE DRAWINGS

With reference to the following description and accompanying drawings:

FIG. 1A illustrates an exemplary transverse flux machine in accordance with an exemplary embodiment;

FIG. 1B illustrates an exemplary commutated flux machine in accordance with an exemplary embodiment;

FIGS. 4A-4C illustrate, in cut-away views, an exemplary transverse flux machine in accordance with an exemplary embodiment;

FIGS. 5A-5C illustrate, in cut-away views, an exemplary transverse flux machine configured with stator tooth overlap in accordance with an exemplary embodiment;

FIGS. 7A-7C illustrate, in cut-away views, an exemplary transverse flux machine configured with extended magnets in accordance with an exemplary embodiment;

FIG. 9A illustrates an exemplary cavity engaged transverse flux machine configured with extended magnets in accordance with an exemplary embodiment;

FIG. 9B illustrates an exemplary cavity engaged commutated flux machine configured with extended magnets in accordance with an exemplary embodiment; and FIG. 9C illustrates an exemplary face engaged transverse flux machine configured with extended magnets in accordance with an exemplary embodiment.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for electrical machine construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical machine, for example an AC synchronous electric motor.

Various shortcomings of prior electrical machines can be addressed by utilizing transverse flux machines and/or commutated flux machines configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

There is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 2A:
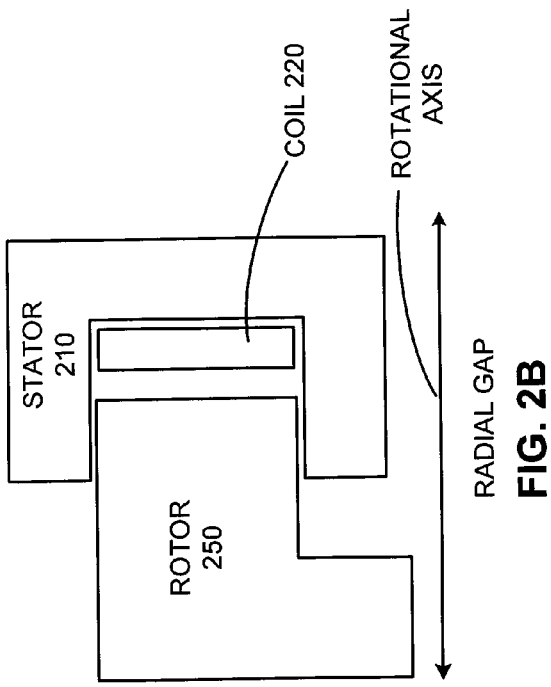
FIG. 2A illustrates an exemplary axial gap configuration in accordance with an exemplary embodiment.
Figure 2B:
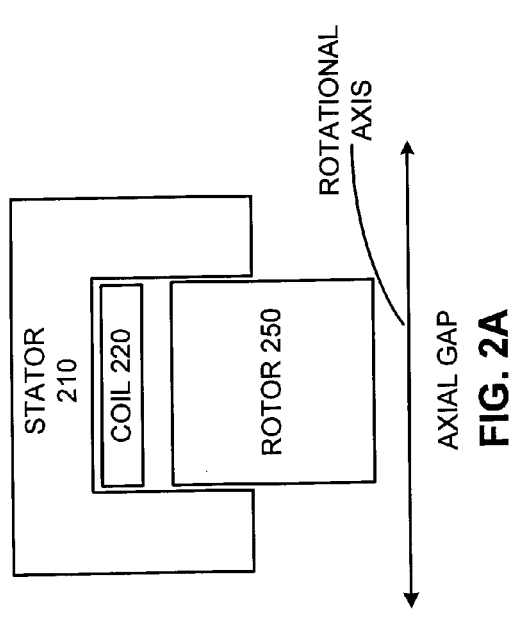
FIG. 2B illustrates an exemplary radial gap configuration in accordance with an exemplary embodiment.

Moreover, transverse flux machines and/or commutated flux machines may be configured in multiple ways. For example, with reference to FIG. 2A, a commutated flux machine may be configured with a stator 210 generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap." Similar approaches may be followed in transverse flux machines and are referred to in a similar manner.

Figure 3A:
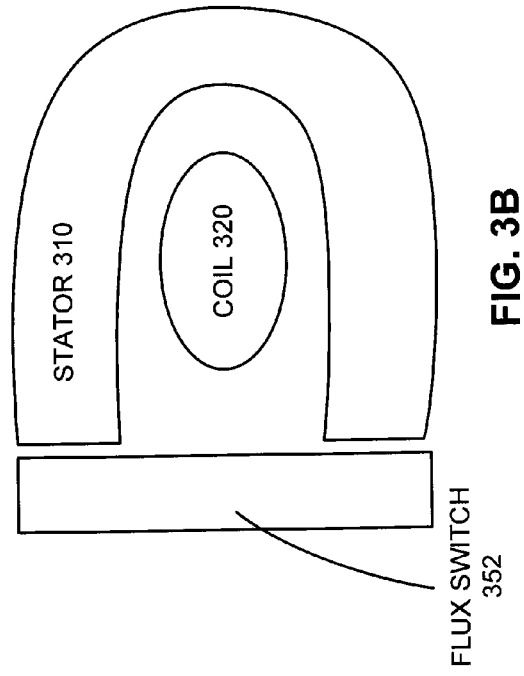
FIG. 3A illustrates an exemplary cavity engaged configuration in accordance with an exemplary embodiment.
Figure 3B:
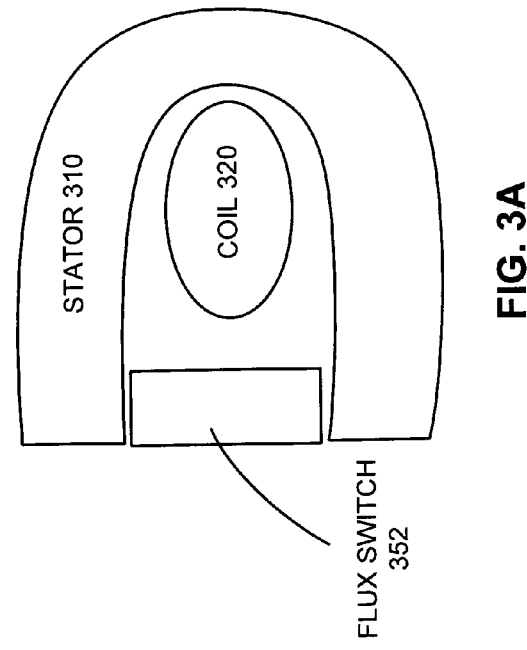
FIG. 3B illustrates an exemplary face engaged configuration in accordance with an exemplary embodiment.
Figure 3C:
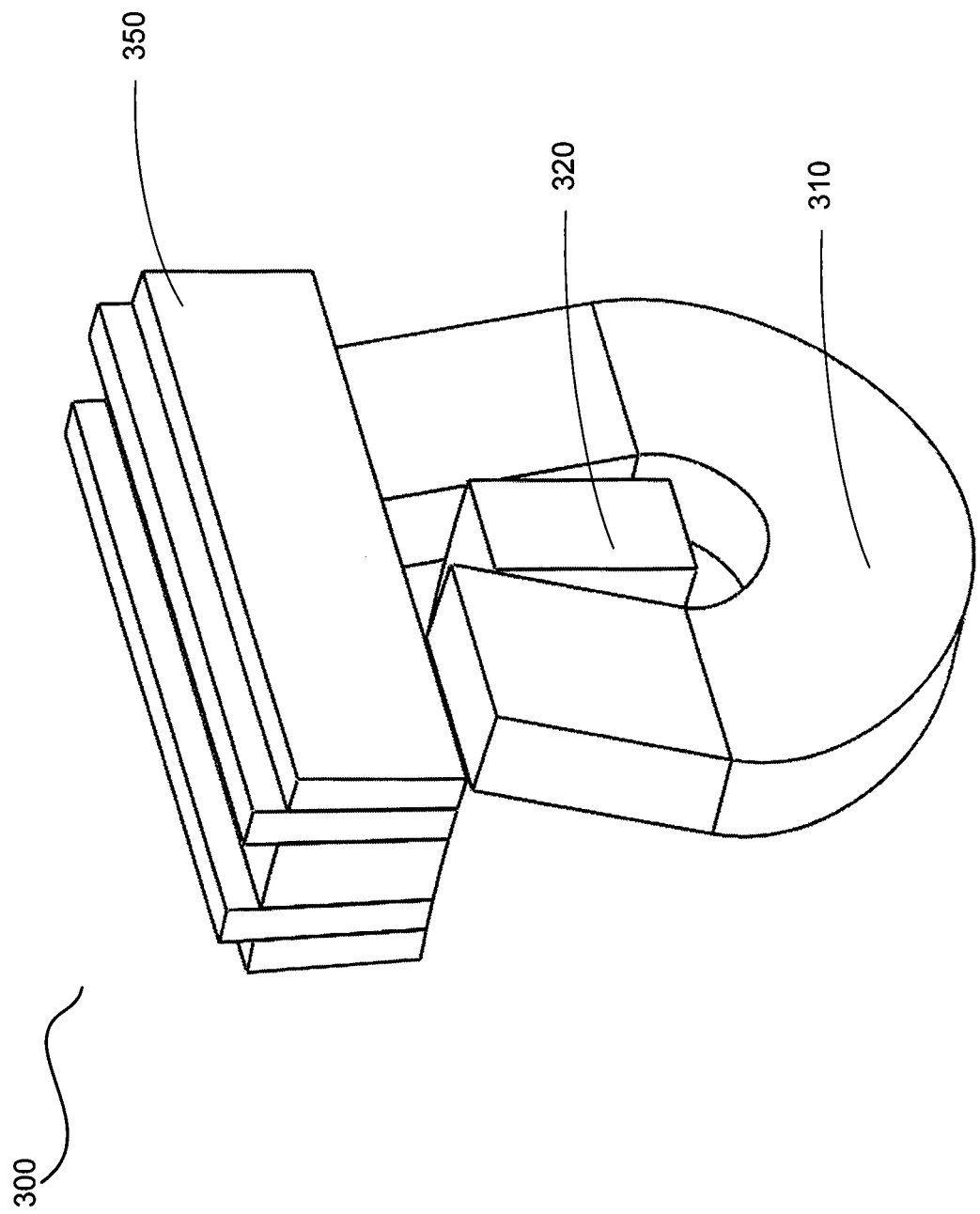
FIG. 3C illustrates an exemplary face engaged transverse flux configuration in accordance with an exemplary embodiment.

With reference now to FIG. 3A, a flux switch 352 in a commutated flux machine may engage a stator 310 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 320 is face engaged with rotor 350 in an axial gap configuration.

Moreover, a transverse flux machine and/or commutated flux machine in accordance with principles of the present disclosure may be configured with any suitable components, structures, and/or elements in order to provide desired electrical, magnetic, and/or physical properties. For example, a commutated flux machine having a continuous, thermally stable torque density in excess of 50 Newton-meters per kilogram of active magnetic material may be achieved by utilizing extended magnets, an overhung rotor, and/or overlapped stator teeth. As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without significant thermal performance degradation and/or damage.

Additionally, in accordance with principles of the present disclosure, a transverse flux machine and/or commutated flux machine may be configured to achieve a higher voltage constant. In this manner, the number of turns in the machine may be reduced, in connection with a higher frequency. A corresponding reduction in coil mass and/or the number of turns in the coil may thus be achieved. Similarly, as the voltage may be higher, the current may be smaller, resulting in a more efficient machine.

Yet further, in accordance with principles of the present disclosure, a transverse flux machine and/or commutated flux machine may be configured to achieve a high flux switching frequency, for example a flux switching frequency in excess of 500 Hz. In general, a flux switching frequency ("fundamental frequency") is equal to the RPM times the number of poles, divided by 120. Thus, because a transverse flux machine and/or commutated flux machine may be configured with a large number of motor poles (for example, 50 poles, 100 poles, 200 poles, and/or more poles), transverse flux machine 600 may have a higher fundamental frequency than various prior motors, prior transverse flux machines, and/or prior commutated flux machines. For example, in an exemplary embodiment a transverse flux machine is configured to achieve a flux switching frequency in excess of 250 Hz at a physical RPM of less than 300 RPM. In another exemplary embodiment, a transverse flux machine is configured to achieve a flux switching frequency in excess of 125 Hz at a physical RPM of less than 250 RPM. In another exemplary embodiment, a transverse flux machine is configured to achieve a flux switching frequency in excess of 500 Hz at a physical RPM of less than 250 RPM. In yet other exemplary embodiments, a transverse flux machine is configured to achieve a flux switching frequency in excess of 1000 Hz at a physical RPM of less than 600 RPM. Because flux is switched at a high frequency, torque density may be increased.

An electrical machine, for example an electric motor, may be any system configured to facilitate the switching of magnetic flux. In an exemplary embodiment, an electric motor may comprise a transverse flux machine and/or a commutated flux machine. In general, a transverse flux machine and/or commutated flux machine comprises a rotor, a stator, and a coil. A flux switch may be located on the stator or the rotor. As used herein, a "flux switch" may be any component, mechanism, or device configured to open and/or close a magnetic circuit (i.e., a portion where the permeability is significantly higher than air). A magnet may be located on the stator or the rotor. Optionally, flux concentrating portions may be included on the stator and/or the rotor.

A coil is at least partially enclosed by the stator or the rotor. In an exemplary embodiment, a "partially enclosed" coil may be considered to be a coil wherein more than 50% of the coil exterior is surrounded by the stator and/or rotor. In another exemplary embodiment, a "partially enclosed" coil may be considered to be a coil wherein a magnet, a flux concentrator, and/or a flux switch surrounds the coil by greater than 180 degrees (i.e., more than halfway around the coil).

In accordance with an exemplary embodiment, and with reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

In accordance with an exemplary embodiment, and with reference now to FIGS. 4A-4C, an electrical machine, for example transverse flux machine 400, generally comprises a rotor 450, a stator 410, and a coil 420. Moreover, transverse flux machine 400 may comprise multiple stators 410. For example, transverse flux machine 400 may comprise a single rotor 450, one or more coils 420, and one or more stators 410. Moreover, via use of a plurality of stators 410, transverse flux machine 400 may be configured to produce polyphase output and/or operate responsive to polyphase input, for example when each of the plurality of stators 410 correspond to a different phase.

In an exemplary embodiment, rotor 450 comprises at least one flux concentrator 452 and at least one magnet 454, each of which may comprise any suitable shape. In an exemplary embodiment, both flux concentrator 452 and magnet 454 are substantially rectangular in three dimensions. In other exemplary embodiments, flux concentrator 452 and magnet 454 are tapered. In various exemplary embodiments, rotor 450 comprises a generally ring-shaped structure comprised of alternating magnets 454 and flux concentrators 452.

Stator 410 may be configured with any suitable shapes, geometries, and/or dimensions configured to facilitate the flow of flux around coil 420. In one exemplary embodiment, stator 410 may be generally U-shaped. The U-shaped stator 410 can be defined as having first leg 415 and second leg 416 linked along a joint 417. Stator 410 may be generally U-shaped with a coupling surface to accommodate a substantially rectangular shaped rotor 450 in a face engaged configuration. In another exemplary embodiment, stator 410 may be configured to be cavity engaged with rotor 450. In addition to U-shaped, in various exemplary embodiments, stator 410 may be configured with C-shaped, rectangular, triangular, rounded cross-sectional shapes, and/or any other suitable shapes known to one skilled in the art.

In an exemplary embodiment, with reference again to FIG. 4A, stator 410 may at least partially enclose coil 420. Coil 420 may be any suitable height, width, and/or length to generate an electrical current responsive to flux switching in stator 410 and/or rotor 450. Coil 420 may also be any suitable height, width, and/or length configured to receive a current to drive rotor 450. In one exemplary embodiment, the interior surface of stator 410 may be configured to mirror the shape and size of the exterior of coil 420. In another exemplary embodiment, stator 410 may be configured to be slightly larger than coil 420. Moreover, in another exemplary embodiment, stator 410 is "wrapped" around coil 420 so that the interior surface of stator 410 is slightly larger than the height and width of coil 420 with a minimized gap between coil 420 and stator 410. Coil 420 may have any suitable length, diameter and/or other dimensions and/or geometries, as desired. For example, coil 420 may have a width of approximately 1 inch. In various exemplary embodiments coil 420 may have a width between about ⅛ inch to about 6 inches. In an exemplary embodiment, coil 420 is substantially circular about an axis of rotation. In other exemplary embodiments, coil 420 is configured with a "banana" and/or "racetrack" type shape. Additional details regarding exemplary coil shapes and configurations are disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

In an exemplary embodiment, coil 420 is coupled to an interior surface of stator 410. Coil 420 may be desirably spaced away from and/or magnetically insulated from rotor 450 and/or stator 410. For example, coil 420 may be desirably spaced away from and/or magnetically insulated from rotor 450 and/or stator 410 in order to reduce eddy currents and/or other induced effects in coil 420 responsive to flux switching.

In an exemplary embodiment, coil 420 is electrically coupled to a current source. The current source may be any suitable current source, but in various exemplary embodiments, the current source is alternating current.

In an exemplary embodiment, coil 420 is generally constructed from copper. However, coil 420 may be made out of any suitable electrically conductive material and/or materials such as silver, gold, aluminum, superconducting materials, and/or the like. In an exemplary embodiment, coil 420 is a loop. The loop is in contrast to windings, which may have greater losses than a single loop. Furthermore, coil 420 may be one solid piece, or may be made by coiling, layering, stacking, and/or otherwise joining many smaller strands or wires of electrically conductive material and/or low-loss materials together. In various exemplary embodiments, coil 420 may be edge-wound or flat-wound, as suitable, in order to reduce eddy currents and/or other losses.

In accordance with an exemplary embodiment, stator 410 and rotor 450 interact to create a magnetic flux circuit. Flux conduction is created, for example, by the switching opposite pole flux concentrators 452 of rotor 450 bridging the gap between the stator 410 switches. In an exemplary embodiment, opposite pole flux concentrators 452 are adjacent and interleaved in rotor 450. In various exemplary embodiments, a flux path is created through the switching elements of stator 410. In another exemplary embodiment, a flux path is created through a magnet 454 separating the adjacent flux concentrators 452 of rotor 450. In an exemplary embodiment, AC synchronous flux flow is generated in response to similar flux conduction and flux paths being created simultaneously in adjacent flux concentrators 452. In another exemplary embodiment, asynchronous flux flow is generated in response to flux conduction and flux paths being created in adjacent flux concentrators 452 at slightly delayed intervals.

In an exemplary generator embodiment, as rotor 450 moves from a first position to a second position relative to stator 410, flux flows in an opposite direction within stator 410, as compared to the first (prior) position of rotor 450. The change in flux direction in stator 410 causes the flux to be conducted around coil 420 in alternating directions. The alternating flux direction results in generation of alternating electrical output in coil 420.

In an exemplary motor embodiment, rotor 450 is driven to rotate. Rotor 450 movement is controlled, in an exemplary embodiment, by a control system which controls, for example, rotor RPM, axial positioning, acceleration, rotational direction, deceleration, starting, and/or stopping. In an exemplary embodiment, rotor 450 is driven in either direction (clockwise or counterclockwise), for example depending on a preference of an operator and/or according to programming. The control system may further comprise programming memory, and a user interface, which may include graphics. The control system may include ports for coupling to additional electrical devices and/or may be coupled to additional electrical devices wirelessly. The control system may further comprise sensors for monitoring and measuring desired values of the system. These values may include one or more of phase matching, phase propagation, input waveforms, output waveforms, flux density, voltage constant, torque constant, webers of flux switched, RPM, system malfunctions, and/or the like. A power source may be coupled to the control system. This power source may be any suitable power source for operation of the control system, such as alternating current, direct current, capacitive charge, and/or inductance. In an exemplary embodiment, the power source is a DC battery.

Portions of rotor 450 and/or stator 410 may comprise any suitable flux conducting material and/or materials, such as steel, silicon steel, amorphous metals, metallic glass alloys, nanocrystaline composite, iron-cobalt alloys, powdered metals such as powdered iron, and/or the like.

In an exemplary embodiment, portions of transverse flux machine 400, such as portions of stator 410 and/or rotor 450, may be comprised of Metglas® brand amorphous metal products produced by Hitachi Metals America, for example Metglas® brand magnetic alloy 2605SA1 and/or the like. In general, such magnetic alloys have excellent flux conducting properties (e.g., permeability, for example, may be up to hundreds of thousands of times the permeability of silicon steel). Such magnetic alloys are also resistant to the effects of heat and losses, such as may occur with high speed operation of devices in accordance with principles of the present disclosure. For example, losses for devices using such magnetic alloys, compared to using silicon steel, may be reduced from about 800 watts to about 30 watts or less, in some exemplary applications. Moreover, utilization of such magnetic alloys can allow for higher speed operation without the need for auxiliary cooling. For example, a device using magnetic alloy in place of silicon steel may be configured to achieve a continuous operation at a higher RPM, for example an RPM two times greater, five times greater, ten times greater, or even more. These features, in addition to other factors, allow the power to weight ratios of exemplary transverse and/or commutated flux machines to increase.

In certain exemplary embodiments, portions of transverse flux machine 400, such as portions of stator 410 and/or rotor 450, may be comprised of stacked laminated steel. The orientation of the laminations may be varied to enhance flux transmission. For instance, certain laminations may be oriented in a radial direction. This approach may enhance mechanical strength and/or ease of assembly. Alternatively, such as for a return portion in a flux conducting element of a stator, the surfaces of the laminations may be oriented parallel to the direction of flux transmission, thereby reducing eddy currents and/or other losses. Minimizing eddy current effects and/or otherwise enhancing flux transmission can also be achieved using powdered iron; however, powdered iron generally does not conduct magnetic flux as efficiently as, for example, steel laminate (or other flux conducting material, such as Metglas® 2605SA1) and does not include the physical layer features potentially useful in minimizing or otherwise addressing eddy current and other losses. In addition, the use of powdered iron may have the further drawback of increased hysteresis losses.

In an exemplary embodiment, portions of transverse flux machine 400, such as portions of magnets 454, may comprise rare earth permanent magnets. Magnetic material may comprise any suitable material, for example neodymium-iron-boron (NIB) material. In an exemplary embodiment, the rare earth permanent magnets have a suitable magnetic field, for example a field in the range of about 0.5 Tesla to about 2.5 Tesla. In other exemplary embodiments, the magnets comprise inducted magnets and/or electromagnets. The inducted magnets and/or electromagnets may be made out of iron, iron alloys, metallic alloys, and/or the like, as well as other suitable materials as is known.

In an exemplary embodiment, a flux concentrator gathers the flux from one or more coupled magnets. A flux concentrator is typically made of some form of iron, such as silicon steel, powdered metals, amorphous metals, metallic glass alloys, nanocrystalline composite, and/or the like. Furthermore, in various exemplary embodiments, the flux concentrator may be made out of any suitable material, for example a material with a high permeability, high flux saturation, and/or high electrical resistance.

In addition to the configurations previously described, various other configurations of a stator may be utilized. These other configurations include, but are not limited to, a gapped stator, a partial stator, and a floating stator. Moreover, principles of the present disclosure may suitably be combined with principles for stators in transverse flux machines and commutated flux machines, for example principles for partial stators, floating stators, and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

In accordance with principles of the present disclosure, hysteresis losses, eddy current losses, and/or other losses in an electrical machine may desirably be reduced by utilizing a stator tooth overlap. In an exemplary embodiment and with reference now to FIGS. 5A-5C, an electrical machine, for example transverse flux machine 500, generally comprises a rotor 550, a stator 510, and a coil 520. Coil 520 is similar to previously described coil 420. Rotor 550 is similar to previously described rotor 450.

In an exemplary embodiment, stator 510 is similar to stator 410 except the geometry of the coupling surface of at least a portion of stator 510 to rotor 550 is modified. In an exemplary embodiment, a portion of stator 510 (e.g. stator tooth surface 518 and stator tooth surface 519 of stator 510) may be increased in size. In one exemplary embodiment, stator tooth surface 518 comprises a portion of a first switch of stator 510 configured to transfer flux from a flux concentrator 552 having a first polarity. In this embodiment, stator tooth surface 519 comprises a portion of an adjacent (interleaved) second switch of stator 510 configured to transfer flux from a different flux concentrator 552 having an opposite polarity. In an exemplary embodiment, stator tooth surface 518 may be extended to substantially mirror at least a portion of an interior face of rotor 550 (e.g. surface 558 of rotor 550). In this example, stator tooth surface 519 of stator 510 may also be extended to substantially mirror at least a portion of an interior face of rotor 550 (e.g. surface 559 of rotor 550). In an exemplary embodiment, stator 510 comprises first leg 515 and second leg 516.

In an exemplary embodiment, stator tooth surface 518 is substantially parallel to an interior face of a magnet 554 and/or flux concentrator 552 of rotor 550. For instance, the size of the air gap between stator 510 and rotor 550 may be substantially constant across the face of lengthened stator tooth surface 518. In an alternative embodiment, the size of the air gap between stator 510 and rotor 550 may be varied across the face of lengthened stator tooth surface 518.

In one exemplary embodiment, stator tooth surface 518 and/or 519 may be shaped to maximize the mirroring of corresponding rotor surface 558 and/or 559. For instance, in one exemplary embodiment, stator tooth surface 518 and/or 519 span a distance (e.g. distance X) substantially equal to a distance spanned by rotor surface 558 and/or 559. In another exemplary embodiment, stator tooth surface 518 and/or 519 span a distance greater than distance X spanned by rotor surface 558 and/or 559. In yet another exemplary embodiment, stator tooth surface 518 and/or 519 span a distance less than a distance X spanned by rotor surface 558 and/or 559. In various exemplary embodiments, the distances spanned by stator tooth surface 518 and 519 are substantially equal. Moreover, the distances spanned by stator tooth surface 518 and 519 may be entirely overlapping, for example in a direction parallel to the rotational axis of rotor 550.

In various exemplary embodiments, stator tooth surface 518 and/or 519 span a distance less than a distance at least one of: greater than 100%, greater than 95%, greater than 90%, greater than 75%, and/or greater than 50% of the distance spanned by rotor surface 558 and/or 559 from one side of rotor 550 to the other opposite side of rotor 550.

In an exemplary embodiment, with renewed reference to FIG. 5A, stator tooth surface 518 may span distance X from side 551 of rotor 550 to side 553 of rotor 550. Stated another way, stator tooth surface 518 may be configured to extend from one edge of rotor 550 to the other edge of rotor 550. In another exemplary embodiment, stator tooth surface 518 spans a distance from side 551 of rotor 550 to less than side 553 of rotor 550. In another exemplary embodiment, stator tooth surface 518 spans a distance from side 553 of rotor 550 to less than side 551 of rotor 550.

In an exemplary embodiment, stator tooth surface 519 spans distance X from side 551 of rotor 550 to side 553 of rotor 550. In another exemplary embodiment, stator tooth surface 519 spans a distance from side 551 of rotor 550 to less than side 553 of rotor 550. In another exemplary embodiment, stator tooth surface 519 spans a distance from side 553 of rotor 550 to less than side 551 of rotor 550.

In an exemplary embodiment, stator tooth surface 518 and stator tooth surface 519 span a distance X, wherein distance X is at least 20 mm. In various exemplary embodiments, stator tooth surface 518 and stator tooth surface 519 span a distance X, wherein distance X is between about 5 mm and about 50 mm. In other exemplary embodiments, stator tooth surface 518 and stator tooth surface 519 span a distance X, wherein distance X is between about 4 mm and about 10 cm. Moreover, stator tooth surface 518 and stator tooth surface 519 may span any suitable distance X.

In various exemplary embodiments, the portion of stator 510 between stator tooth surface 518 and/or stator tooth surface 519 and coil 520 substantially uniformly increases in thickness from one side of stator 510 to the opposite side of stator 510 in a direction towards coil 520. The substantially uniform increase in thickness from one side of stator 510 to the opposite side of stator 510 is in a direction orthogonal to stator tooth surface 518 and/or stator tooth surface 519. Stated another way, the thickness (i.e. distance between the side of the stator teeth opposite the rotor, and the coil 520) of a stator tooth may increase from one side of the stator 510 to the opposite side of the stator 510. In another exemplary embodiment, the portion of stator 510 between the lengthened stator tooth surface 518 and/or stator tooth surface 519 and coil 520 may be substantially constant from one side of stator 510 to the opposite side of stator 510. In another exemplary embodiment, the thickness (i.e. distance between the stator tooth surface 518, 519 and the coil) may increase, decrease, remain constant, and/or vary across stator tooth surface 518 and/or stator tooth surface 519 towards coil 520 from one side of stator 510 to the opposite side of stator 510.

In an exemplary embodiment, with reference again to FIGS. 5A-5C, gap 528 separates the interconnection of stator leg 515 and stator leg 516 towards the top of stator 510. In an exemplary embodiment, gap 528 assists with directing the flow of flux through stator 510 in a desired manner. Gap 528 may be any suitable width for directing the flux through stator 510. For example, gap 528 may be a suitable width such that only a minimal amount of flux transfers from stator leg 515 to stator leg 516 without passing around coil 520. Gap 528 may be in any location on stator 510. In one exemplary embodiment, gap 528 travels in a substantially diagonal path from a first side of stator 510 towards coil 520. In another exemplary embodiment, gap 528 spans in one of a curved, angled, or non-uniform path from a first side, top, second side, or bottom of stator 510 towards coil 520.

In an exemplary embodiment, the extended portions of stator 510 comprise a set of stator "teeth." A stator tooth may be shaped to mate with a portion of rotor 550 and transfer magnetic flux between rotor 550 and stator 510. The shape of a stator tooth may be shaped to maximize the engagement and transfer of flux over a mating surface of the stator tooth. Moreover, the shape of a stator tooth may be shaped to maximize the engagement of flux over a mating surface of the stator tooth while generating a flow of flux around coil 520 in a desired direction. Moreover, in various exemplary embodiments, and with reference to FIGS. 5F and 5I, the shape of the stator tooth may be configured to reduce hysteresis losses in rotor 550. Additionally, in various exemplary embodiments, the shape of the stator tooth may contribute to reduced eddy current losses in coil 520, for example by at least partially "shielding" coil 520 from flux switching across the air gap between rotor 550 and stator 510. In an exemplary embodiment, the shape of the stator tooth may be shaped to produce an electrical machine with a high torque density. Additionally, the shape of the stator tooth may be shaped to produce an electrical machine with a smaller physical footprint, for example a reduced length along the axis of rotation of transverse flux machine 500.

Additionally, the shape of the stator tooth may be shaped to at least partially guide and/or influence the flow of flux in rotor 550. For instance, in one exemplary embodiment, the shape of the stator tooth may be shaped so that the surface of a stator tooth at least mirrors the dimensions of the surface of rotor 550 associated with the switching interface.

In an exemplary embodiment and with renewed reference to FIG. 5A, from one perspective, alternating stator teeth of adjacent stator portions (e.g. the stator teeth associated with stator tooth surface 518 and/or stator tooth surface 519) may overlap each other without the teeth portions touching. In an exemplary embodiment, from one perspective, alternating stator teeth of adjacent stator portions (e.g. the stator teeth associated with stator tooth surface 518 and/or stator tooth surface 519) may overlap each other by any desired percentage without the teeth portions touching, such as 100% overlap or less than 100% overlap.

"100% overlap" may be understood to mean alternating stator teeth extending fully from one side of stator 510 to the other. "0% overlap" may be understood to mean alternating stator teeth extending from the side of stator 510 to the middle of stator 510. Moreover, "0% overlap" may also be understood to mean alternating stator teeth extending from the side of stator 510 to a position other than the middle of stator 510, provided the stator teeth originating on the first side of stator 510 extend to the same location as the stator teeth originating on the opposing side of stator 510.

In an exemplary embodiment, in transverse flux machine 500 configured with 100% stator tooth overlap, the flux in flux concentrators 552 in rotor 550, in both a first position of rotor 550 and a second position of rotor 550, is primarily in a direction towards stator 510. Stated another way, changes in the direction of flux flow in flux concentrators 452 in a direction parallel to the axis of rotation of rotor 550 ("side to side" changes in flux flow) are reduced.

In another exemplary embodiment, in transverse flux machine 500 configured with less than 100% stator tooth overlap, the flux in flux concentrators 552 in rotor 550, in both a first position of rotor 550 and a second position of rotor 550, moves at least partially in the direction of the stator coupling which is generally from one side of flux concentrator 552 in a first position to an opposite side of flux concentrator 552 in a second position. As discussed below, this "side to side" flux flow creates hysteresis losses in flux concentrator 552.

Figure 5E:
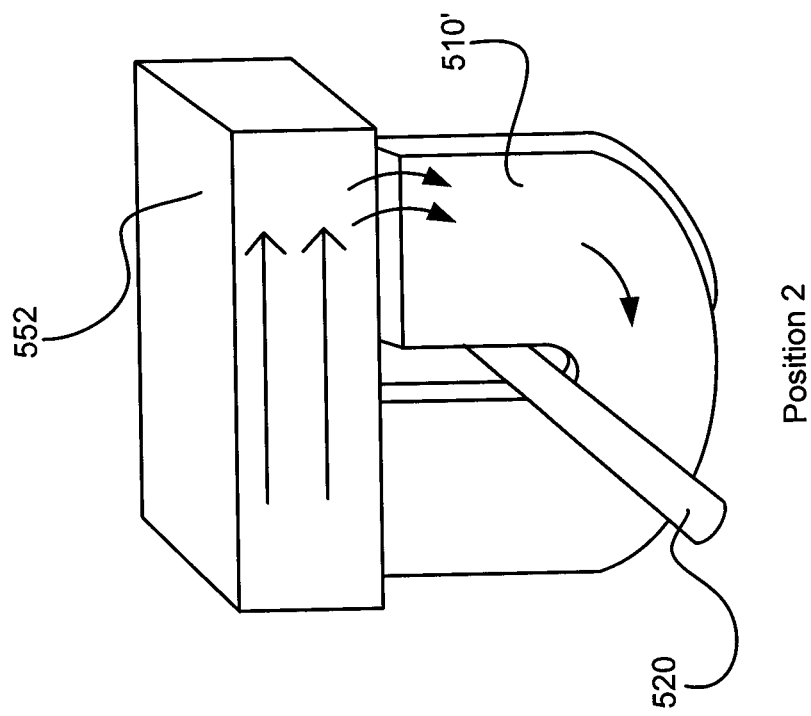
FIG. 5E illustrates the flow of flux in a second position of an exemplary face engaged transverse flux machine lacking stator tooth overlap in accordance with an exemplary embodiment.
Figure 5D:
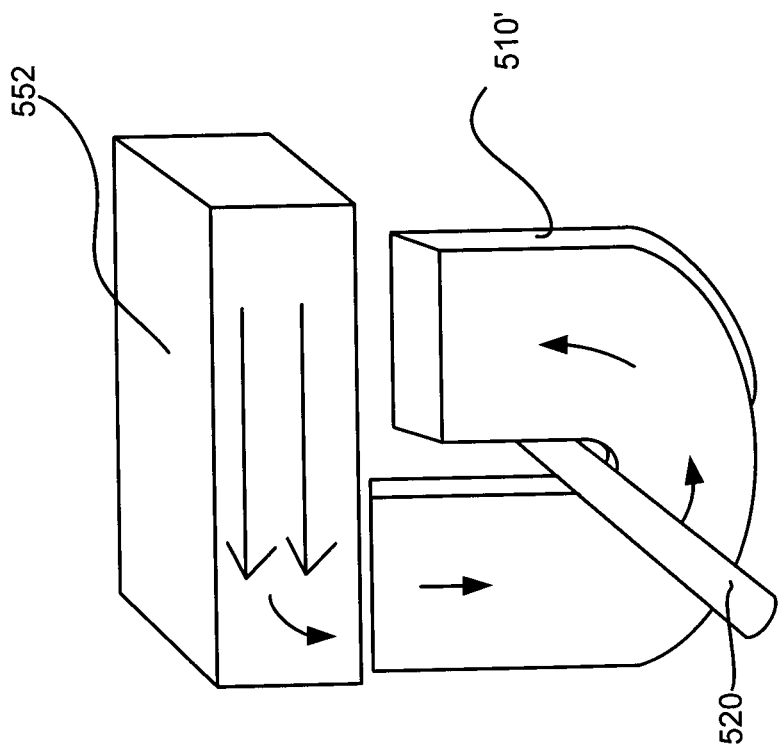
FIG. 5D illustrates the flow of flux in a first position of an exemplary face engaged transverse flux machine lacking stator tooth overlap in accordance with an exemplary embodiment.
Figure 5F:
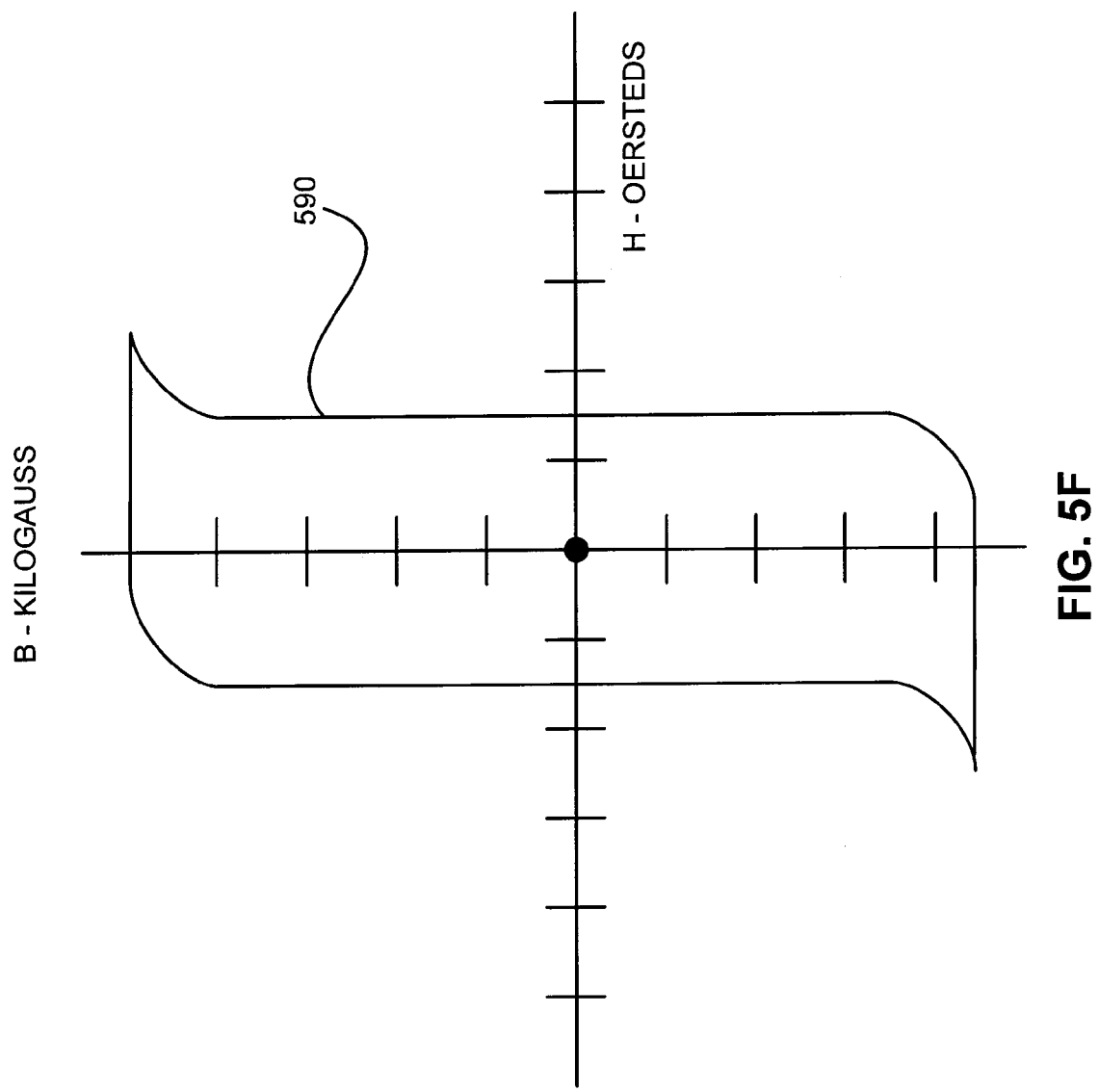
FIG. 5F illustrates an exemplary hysteresis loop in a flux concentrator of the transverse flux machine of FIGS. 5D-5E.

In an exemplary embodiment, and with reference now to FIGS. 5D and 5E wherein 100% stator tooth overlap is not present, flux flows through flux concentrator 552 to stator 510' as rotor 550 (not fully shown in FIGS. 5D-5E) rotates. As shown in FIG. 5D, in a first position, flux travels through flux concentrator 552 towards the side of flux concentrator 552 where the coupling between stator 510' and flux concentrator 552 is made (e.g., in a generally "left" and "down" direction as illustrated in FIG. 5D). As shown in FIG. 5E, in a second position flux travels through flux concentrator 552 towards the opposite side of flux concentrator 552 where the coupling between stator 510' and flux concentrator 552 is now made (e.g., in a generally "right" and "down" direction as illustrated in FIG. 5E). This change in direction of flux flow in flux concentrator 552 as a consequence of rotor 550 moving from a first position to a second position may cause losses in transverse flux machine 500. In one exemplary embodiment, these losses are hysteresis losses in flux concentrator 552. An exemplary hysteresis loop 590 associated with the change in flux direction in flux concentrator 552 illustrated in FIGS. 5D and 5E is depicted in FIG. 5F. The hysteresis losses are represented by the area circumscribed by hysteresis loop 590, as is known.

Figure 5H:
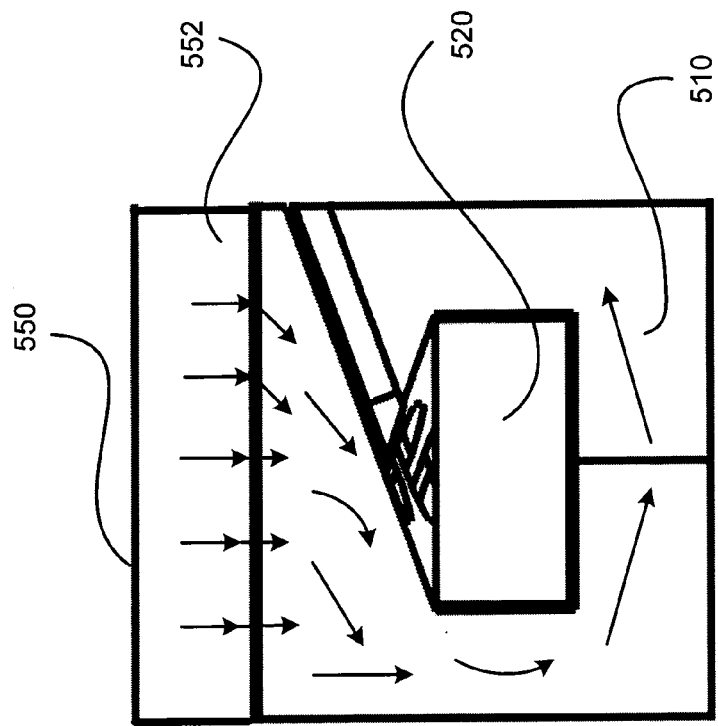
FIG. 5H illustrates the flow of flux in a second position of an exemplary face engaged transverse flux configuration configured with stator tooth overlap in accordance with an exemplary embodiment.
Figure 5G:
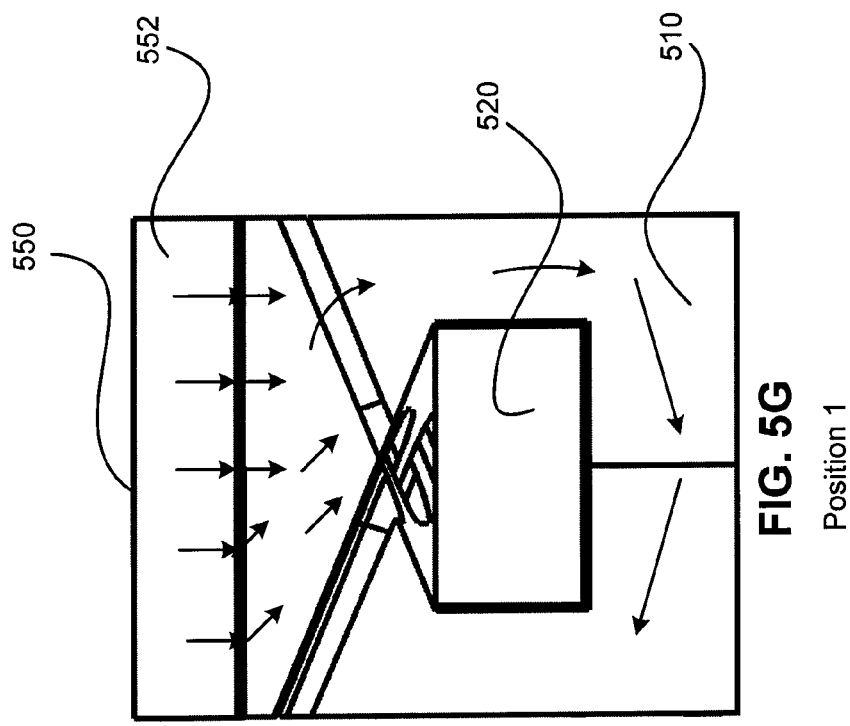
FIG. 5G illustrates the flow of flux in a first position of an exemplary face engaged transverse flux configuration configured with stator tooth overlap in accordance with an exemplary embodiment.

In contrast, in an exemplary embodiment configured with 100% stator tooth overlap, and with reference to FIGS. 5G and 5H, flux flows through flux concentrator 552 on rotor 550 to stator 510. As illustrated in FIG. 5G, in position 1 flux travels through flux concentrator 552 substantially towards the stator tooth surface (for example, stator tooth surfaces 518 and 519 as illustrated in FIG. 5B) where the coupling between stator 510 and rotor 550 is made. In this position, the primary flux path through flux concentrator 552 is substantially "down" towards the extended stator teeth.

As illustrated in FIG. 5H, in position 2 flux travels through flux concentrator 552 substantially towards the stator tooth surface (for example, stator tooth surfaces 518 and 519 as illustrated in FIG. 5B) where the coupling between stator 510 and rotor 550 is made. In this position, the primary flux path through flux concentrator 552 remains substantially "down" towards the extended stator teeth. Because the stator tooth surfaces are configured with 100% stator tooth overlap, flux is transferred from flux concentrator 552 in a similar direction in both position 1 and position 2, as the alternating stator teeth each engage flux concentrator 552 along a similar length (which may be the entire length of flux concentrator 552).

Figure 5I:
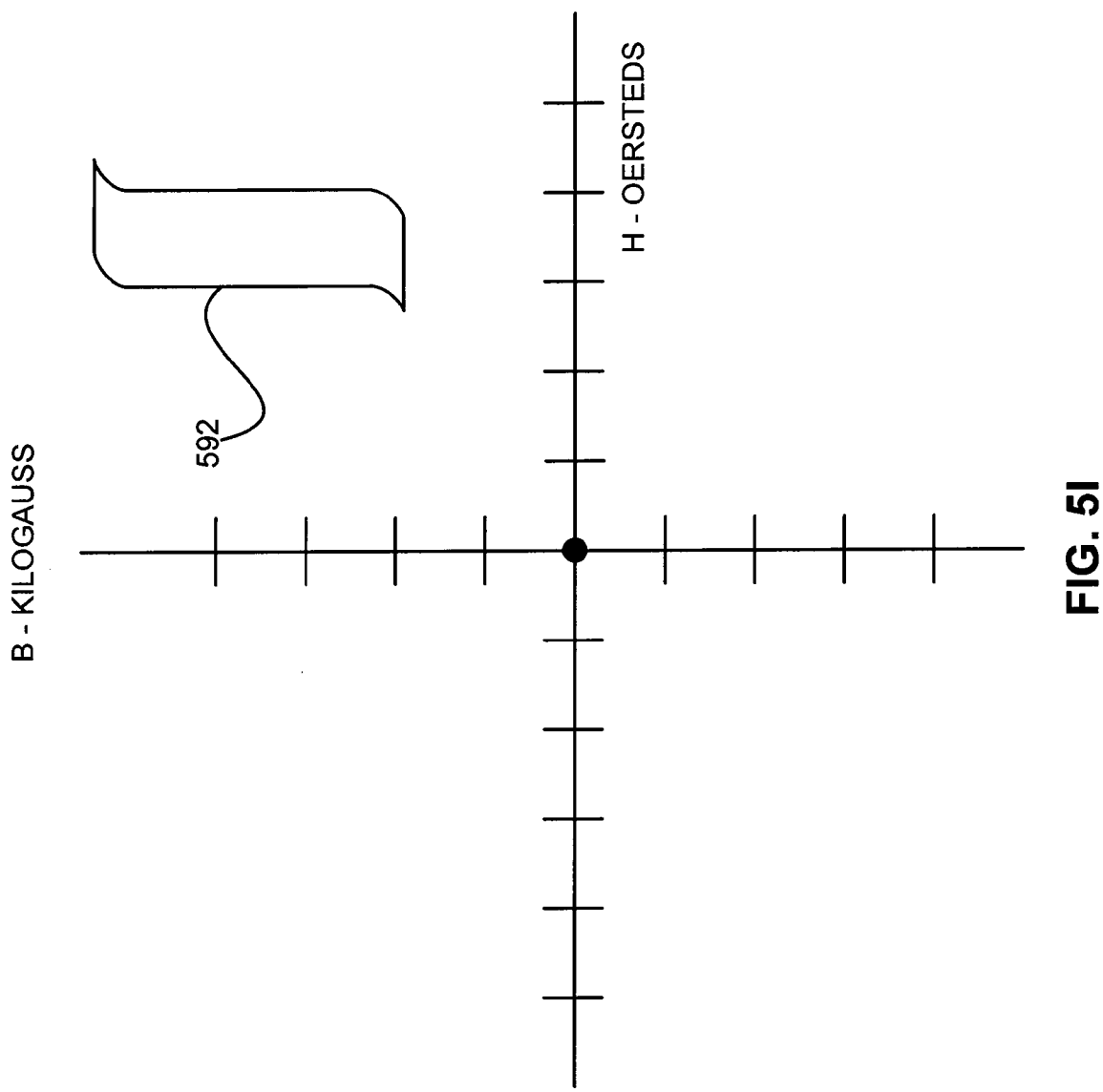
FIG. 5I illustrates an exemplary hysteresis loop in a flux concentrator of the transverse flux machine of FIGS. 5G-5H.

This reduction and/or elimination of change in flux direction in flux concentrator 552 (as compared with the configurations illustrated in FIGS. 5D and 5E) results in reduced losses, such as hysteresis losses. An exemplary hysteresis loop 592 associated with the change from a first position to a second position and back again to the first position with respect to FIGS. 5G and 5H is illustrated in FIG. 5I. Comparing hysteresis loop 590 of FIG. 5F with hysteresis loop 592 of FIG. 5I illustrates a reduction in area circumscribed by hysteresis loop 592 as compared to hysteresis loop 590. The scale in FIGS. 5F and 5I is the same. The hysteresis loop in FIG. 5I is shifted to one quadrant of the graph as compared to the hysteresis loop of FIG. 5F. The hysteresis loop in FIG. 5I depicts a change in magnitude in a single direction of a vector of hysteresis losses. Thus, a reduction in losses, such as hysteresis losses and/or eddy current losses may be achieved as reversals in the direction of magnetic flux flow and/or changes in the magnitude of magnetic flux flow within flux concentrator 552 are reduced, minimized, and/or eliminated.

Figure 6B:
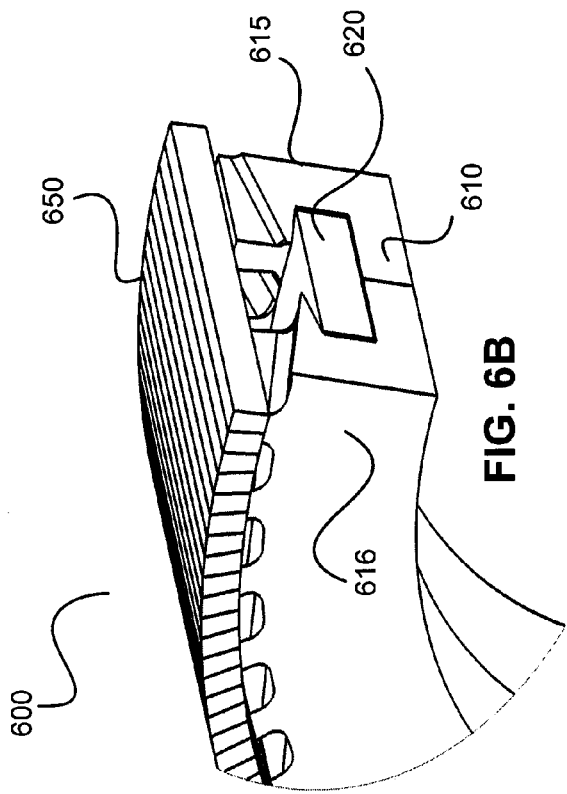
FIGS. 6A-6C illustrate, in cut-away views, an exemplary transverse flux machine configured with an overhung rotor in accordance with an exemplary embodiment.
Figure 6C:
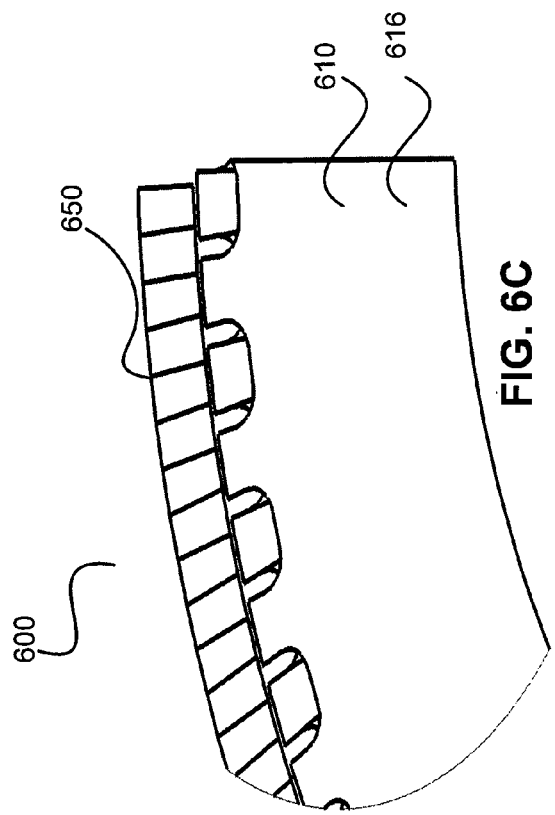
Figure 6A:
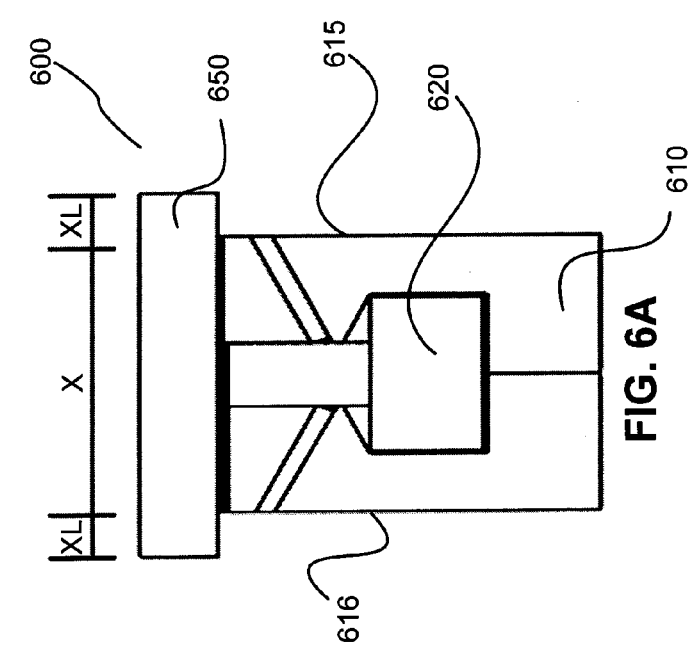

In addition to stator tooth overlap, principles of the present disclosure contemplate electrical machines configured with "overhanging" rotors and/or stators. As used herein, "overhang," "overhanging," "overhung," or similar terminology refers to a portion of a rotor extending beyond a corresponding stator (or vice versa) in a direction substantially parallel to an air gap therebetween. In an exemplary embodiment and with reference to FIGS. 6A-6C, an electrical machine, for example transverse flux machine 600, generally comprises a rotor 650, a stator 610, and a coil 620. Coil 620 is similar to previously described coil 420 and stator 610 is similar to previously described stator 410. Rotor 650 is similar to previously described rotor 450 except at least a portion of rotor 650 (in an axial gap, face engaged configuration) has been extended in a direction substantially parallel to the axis of rotation of rotor 650. In another exemplary embodiment, rotor 650 is similar to previously described rotor 450 except at least a portion of rotor 650 (in a radial gap, face engaged configuration) has been extended in a direction substantially orthogonal to the axis of rotation of rotor 650.

In an exemplary embodiment, stator 610 comprises side 615 and side 616. In one exemplary embodiment, stator 610 may span a distance (e.g. distance X) between side 615 of stator 610 and side 616 of stator 610. In this embodiment, a portion of rotor 650 may be overhung beyond side 615 and/or side 616 of stator 610. Stated another way, rotor 650 spans a distance greater than X.

In an exemplary embodiment, a portion of rotor 650 may be overhung beyond side 615 and/or side 616 of stator 610 in order to provide a desired attribute of a transverse flux machine and/or commutated flux machine. For instance, as described below, in an exemplary embodiment, a portion of rotor 650 in a polyphase device may be overhung beyond the sides of all the stators in the polyphase device, in order to configure the back EMF waveforms of each phase in the polyphase device to have substantially equal peak magnitudes.

In an exemplary embodiment, rotor 650 may be overhung beyond side 615 and/or side 616 of stator 610 by a length XL. Length XL may be a length configured to facilitate a suitable sensor reading, for example a Hall effect sensor reading associated with rotation of rotor 650. Moreover, length XL may be equal to or greater than a predetermined distance calculated based on desirable sensor placement characteristics. These desirable sensor placement characteristics may include ease of accessing a sensor, ease of attaching a sensor, quality of readings from a sensor, minimizing the effect of a sensor on the electrical machine, and/or the like.

In various exemplary embodiments, length XL may be a function of a desired back EMF voltage magnitude associated with one or more coils 620. In an exemplary embodiment, the portion of rotor 650 overhung beyond side 615 and/or side 616 of stator 610 (the "overhung portion") may be configured to increase the amount of flux transferred between stator 610 and rotor 650. For instance, in a system without an overhung portion of rotor 650, the flux density near an edge of stator 610 may be less than the flux density near the center of stator 610. Thus, in an exemplary embodiment, transverse flux machine 600 configured with an overhung portion of rotor 650 switches more flux than a comparable transverse flux machine 600 lacking an overhung portion of rotor 650. Moreover, configuring transverse flux machine 600 with an overhung portion of rotor 650 can allow transverse flux machine 600 to operate more efficiently.

In various exemplary embodiments, length XL may be selected based at least in part on one or more desired operational characteristics of transverse flux machine 600. In various exemplary embodiments, when the length of rotor 650 is X as measured at the switching surface of rotor 650, length XL may be configured to be between about 1% of X and about 20% of X. In another exemplary embodiment, length XL is about 2.75 mm. In various exemplary embodiments, length XL is between about 0.5 mm and about 10 mm.

In various exemplary embodiments, the overhung portion of rotor 650 may comprise a magnet, a flux concentrator, or a combination thereof. Additionally, the overhung portion of rotor 650 may be integral to the magnet, flux concentrator, or combinations thereof. In certain exemplary embodiments, the overhung portion of rotor 650 is made of the same materials as the magnet or the flux concentrator, respectively.

Additionally, sensors and/or other measuring devices may be coupled to any suitable part of transverse flux machine 600 by any suitable means. These devices may include devices to measure RPM, magnetic field strength, efficiency of the system, and/or the like. The coupling may be physical, electromechanical, magnetic, and/or electrical. In one exemplary embodiment, a Hall effect sensor coupled to transverse flux machine 600 may return a measurement based at least in part on an overhung portion of rotor 650. This coupling may be by any suitable method at any desired location. For example, the sensor may be coupled by clamping, welding, exposing, gluing, screwing, bolting, and/or the like. Sensors may be used for proximity switching, positioning, speed detection, positioning of the rotor, current sensing applications, and/or any other suitable applications. Sensors may utilize circuitry to be interfaced to a provided microprocessor. These interfaces may include input diagnostics, fault protection for transient conditions, and short/open circuit detection. Additionally, sensors may also provide and monitor the current to the sensor itself. In an exemplary embodiment, the length XL of the overhung portion of rotor 650 is a function of desired sensor placement.

In various exemplary embodiments, principles of overhanging rotors may be combined with principles of stator tooth overlap. Moreover, in addition to overlapped stator teeth and overhung rotors, principles of the present disclosure contemplate electrical machines having extended magnets or other components configured to reduce flux leakage, particularly flux leakage across a side of a rotor or stator opposite a switching side (for example, flux leakage across a back side of a rotor).

In an exemplary embodiment, with reference now to FIGS. 7A-7C, an electrical machine, for example transverse flux machine 700, generally comprises a rotor 750, a stator 710, and a coil 720. Coil 720 is similar to previously described coil 420 and stator 710 is similar to previously described stator 410. In an exemplary embodiment, rotor 750 is similar to previously described rotor 450 except at least a portion of rotor 750 has been extended (in an axial gap configuration) in a direction substantially orthogonal to the axis of rotation of rotor 450. In another exemplary embodiment, rotor 750 is similar to previously described rotor 450 except at least a portion of rotor 750 has been extended (in a radial gap configuration) in a direction substantially parallel to the axis of rotation of rotor 750. In various exemplary embodiments, at least a portion of rotor 750 (for example, a magnet 754) may be extended in at least one direction substantially away from coil 720. In various exemplary embodiments, at least a portion of rotor 750 (for example, a magnet 754) may be extended in any direction with the exception of into an air gap between rotor 750 and stator 710.

In various exemplary embodiments, one or more magnets 754 are extended on rotor 750. In an exemplary embodiment, all of an extended magnet 754 is integral to and made from the same material. In an axial gap configuration, extended magnet 754 extends in a direction orthogonal to the axis of rotation of rotor 750. In an exemplary embodiment, the top surface of extended magnet 754 may be a constant height from side 755 of extended magnet 754 to side 756 (as illustrated in FIG. 7A). In another exemplary embodiment, the top surface of extended magnet 754 may vary in height from one end (e.g., side 756) of extended magnet 754 to the other (e.g., side 755).

In accordance with an exemplary embodiment, the top surface of extended magnet 754 may be substantially flat. In accordance with another exemplary embodiment, the top surface of extended magnet 754 may have any suitable shape and/or geometry, such as curved, pointed, irregular, and/or the like. For example, as viewed from the side perspective of FIG. 7C, although only shown flat in FIG. 7C, the tops of one or more of extended magnets 754 may have a triangular peak shape.

In accordance with an exemplary embodiment, and with reference to FIG. 7C, extended magnet 754 may be configured with any suitable width W. In various exemplary embodiments, extended magnet 754 may be configured with a width W from about 0.7 mm to about 5 mm. Extended magnet 754 may be configured with a uniform width. Moreover, the portion of extended magnet 754 extending above adjacent flux concentrators 752 may be thicker; alternatively, the portion of extended magnet 754 extending above adjacent flux concentrators 752 may be thinner.

In an exemplary embodiment, extended magnets 754 may be interleaved between flux concentrators 752 in rotor 750. With reference to FIG. 7A, the height of the extended portion of extended magnet 754 may be measured as a height (e.g., height Y) from the exterior surface of an adjacent flux concentrator 752.

In an exemplary embodiment, the height of extended magnet 754, measured from the highest surface of an adjacent flux concentrator 752 to the lowest top exterior surface of extended magnet 754, increases as the gap between interleaved flux concentrators 752 narrows. Stated another way, extended magnet 754 is preferably extended more as the width of extended magnet 754 decreases. Therefore, the height of extended magnet 754, measured from the highest surface of an adjacent flux concentrator 752 to the lowest top exterior surface of extended magnet 754, may increase as the width of extended magnet 754 is decreased.

In another exemplary embodiment, the height Y of extended magnet 754 is represented by the equation $Y=G/2$, where G is the width of a gap between adjacent flux concentrators 752 (i.e., G is generally about equal to the width of extended magnets 754).

In another exemplary embodiment, the height Y of extended magnet 754 is greater than or equal to a height configured to prevent leakage of a desired amount (and/or preselected amount) of flux from a first flux concentrator 752 to a second flux concentrator 752 over the extended portion of extended magnet 754. In one exemplary embodiment, this desired amount of flux may be about zero flux. In other exemplary embodiments, the amount of flux leaked may be about 50% or less of the flux that is leaked when magnets 754 are not extended. In yet other exemplary embodiments, the amount of flux leaked may be about 10% or less of the flux that is leaked when magnets 754 are not extended. Furthermore, height Y may be selected to achieve any suitable flux leakage reduction at this location in transverse flux machine 700.

In an exemplary embodiment, the height Y of extended magnet 754 is about 2 mm. In various exemplary embodiments, the height Y of extended magnet 754 is between about 0.5 mm and about 6 mm. Moreover, height Y may be any suitable height configured to block at least a portion of flux from leaking between adjacent flux concentrators 752.

In an exemplary embodiment, the height Y of extended magnet 754 is configured to produce increased reliability of transverse flux machine 700. In another exemplary embodiment, the height Y of extended magnet 754 is configured to produce higher efficiency of transverse flux machine 700, for example by reducing flux leakage and/or associated eddy current losses. In yet another exemplary embodiment, the height Y of extended magnet 754 is configured to reduce core losses. Reduced core losses may result in less heat produced within transverse flux machine 700 and a reduction and/or elimination of a need for active cooling of transverse flux machine 700.

In an exemplary embodiment, the extended portion of extended magnet 754 may be created by coupling a flux leakage blocker to rotor 750. The flux leakage blocker may be coupled to extended magnet 754 and/or flux concentrator 752. The flux leakage blocker may be made from the same material as the extended magnet 754; alternatively, the flux leakage blocker may be made from a different material. For instance, in one exemplary embodiment, the flux leakage blocker comprises a material having permeability less than the permeability of air. In another exemplary embodiment, a coating is applied to the exterior surface of flux concentrator 752 and/or extended magnet 754 in order to inhibit flux leakage. In another exemplary embodiment, a material is coupled to the exterior surface of flux concentrator 752 and/or extended magnet 754, such as a polymer and/or artificial elastomer, to reduce flux leakage. Flux leakage blockers may be utilized in place of and/or in addition to the extended portion of extended magnet 754.

Figure 7D:
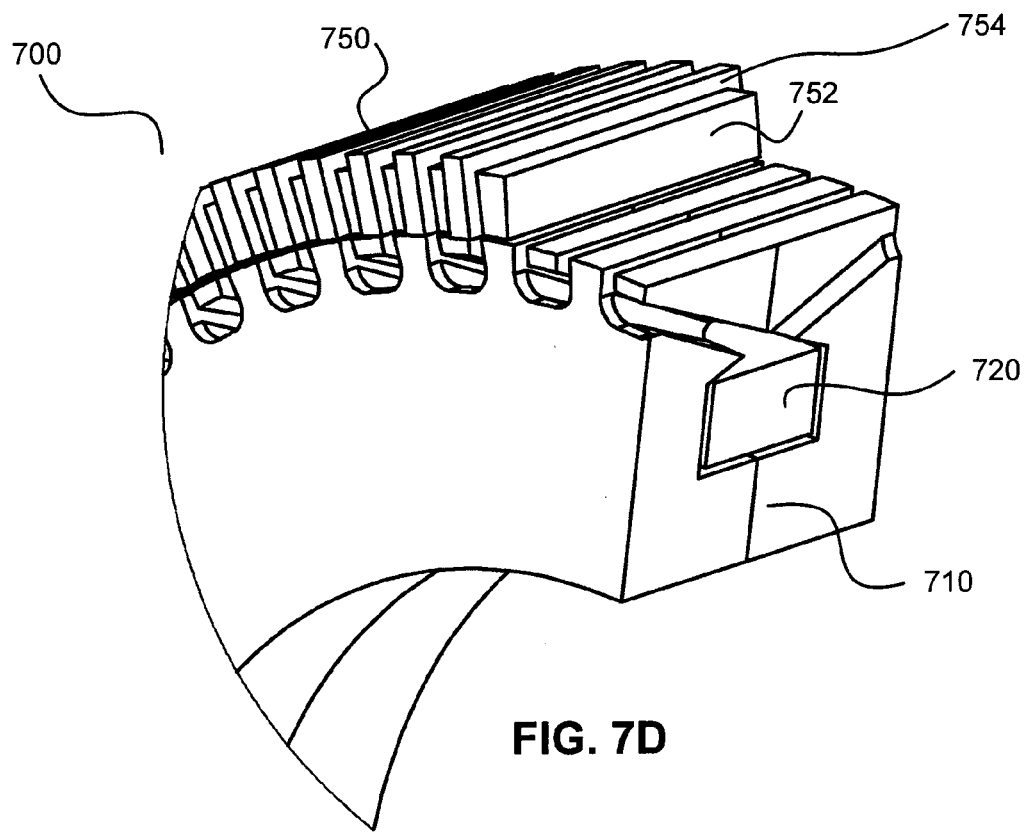
FIG. 7D illustrates, in a cut-away view, another exemplary transverse flux machine configured with extended magnets in accordance with an exemplary embodiment.

With reference now to FIG. 7D, in various exemplary embodiments, extended magnet 754 may be extended in multiple directions. For example, extended magnet 754 may be extended in a direction substantially orthogonal to the air gap, as previously discussed. Extended magnet 754 may also be extended in a direction substantially parallel to the air gap. Stated another way, in various exemplary embodiments extended magnet 754 may be extended in at least one of a direction orthogonal to the axis of rotation, a direction parallel to the axis of rotation, and/or combinations of the same. As illustrated in FIG. 7D, in these embodiments extended magnet 754 may more thoroughly "block" the leakage of flux between adjacent flux concentrators 752.

Figure 7E:
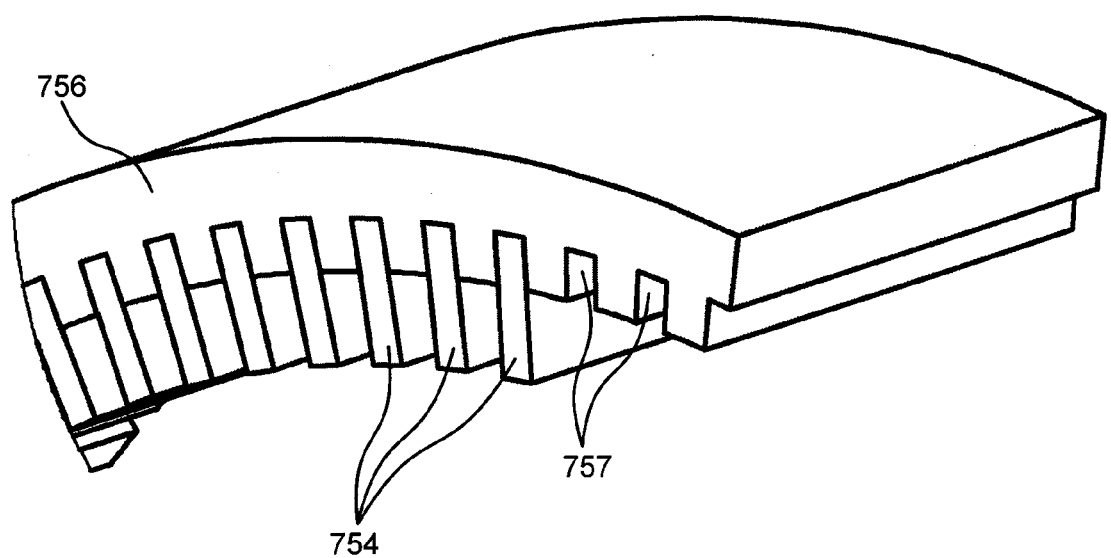
FIG. 7E illustrates, in a cut-away view, an exemplary support structure in accordance with an exemplary embodiment.

In an exemplary embodiment, with reference now to FIG. 7E, transverse flux machine 700 may comprise a structural support, such as rotor body 756. In this embodiment, rotor body 756 may function as an assembly aid for coupling and/or aligning extended magnets 754 and/or flux concentrators 752. For instance, the extended magnets 754 may be used as a guide. In one exemplary embodiment extended magnets 754 may be inserted into channels and/or slots 757 of rotor body 756. Rotor body 756 may be monolithic. Rotor body 756 may also comprise a plurality of sections. Rotor body 756 at least partially contains, surrounds, and/or otherwise provides structural support to a plurality of magnets 754 and flux concentrators 752. In various exemplary embodiments, rotor body 756 comprises aluminum. In other exemplary embodiments, rotor body 756 comprises a polymeric composite. Moreover, rotor body 756 may comprise any suitable material configured to provide structural strength to rotor 750. Additionally, rotor body 756 may comprise portions and/or materials configured to reduce flux leakage.

Principles of the present disclosure may suitably be combined with principles for transverse flux machines and commutated flux machines as disclosed in U.S. patent application Ser. No. 12/772,959 filed on May 3, 2010, now U.S. Patent Application Publication No. 2011/0169381 entitled "TRANSVERSE AND/OR COMMUTATED FLUX SYSTEMS FOR ELECTRIC BICYCLES", the contents of which are hereby incorporated by reference in their entirety.

Figure 7G:
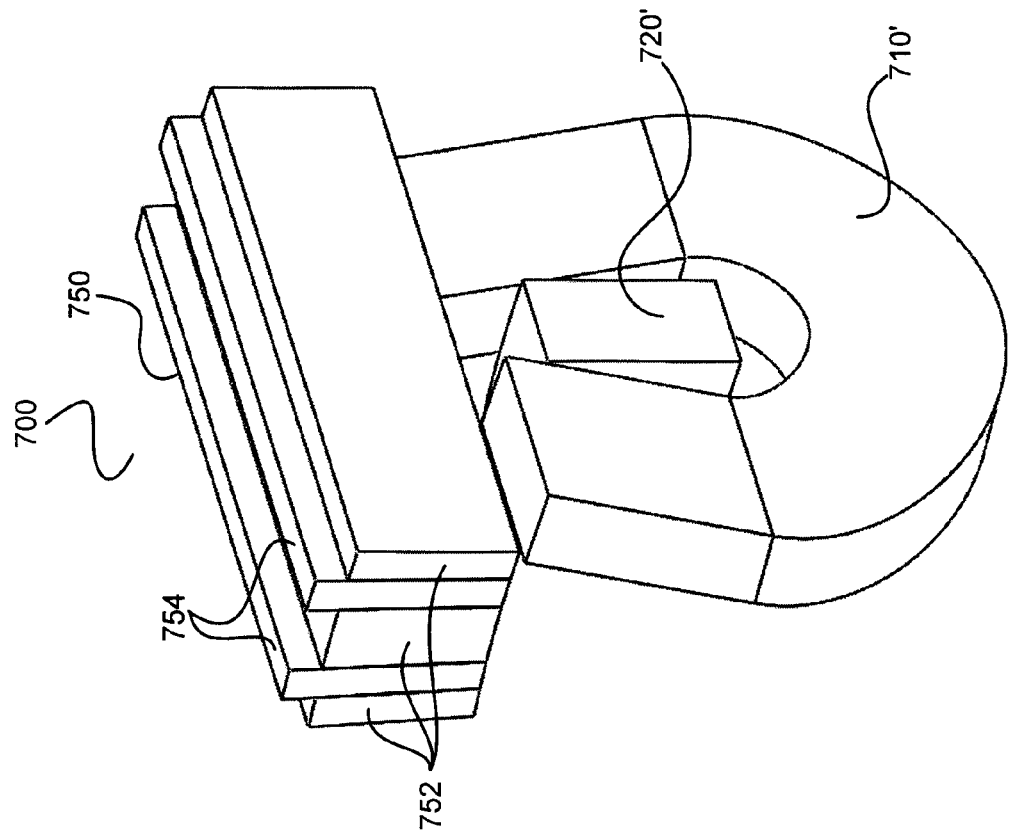
FIG. 7G illustrates the reduction of flux leakage across the back of a rotor in an exemplary face engaged transverse flux machine configured with extended magnets in accordance with an exemplary embodiment.
Figure 7F:
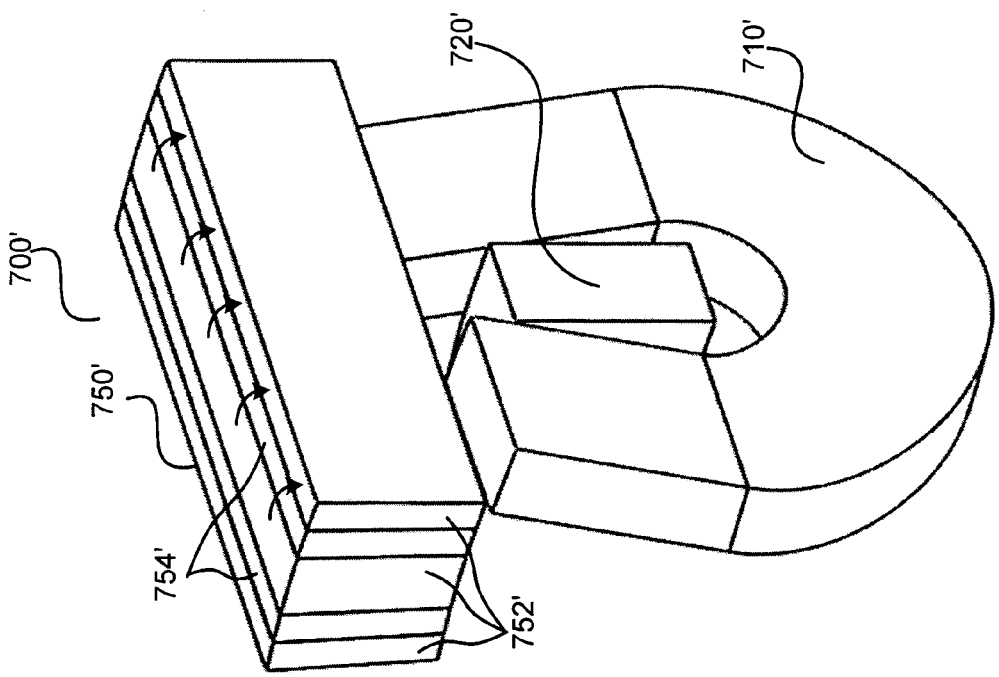
FIG. 7F illustrates flux leakage across the back of a rotor in an exemplary face engaged transverse flux machine lacking extended magnets in accordance with an exemplary embodiment.

With reference now to FIG. 7F, in an exemplary embodiment an electrical machine, for example transverse flux machine 700', generally comprises rotor 750', stator 710', and coil 720'. Rotor 750' is configured to interact with stator 710' in order to facilitate switching of magnetic flux. Stator 710' is configured to be magnetically coupled to rotor 750', and is configured to facilitate flow of magnetic flux via interaction with rotor 750'. Coil 720' is configured to generate an output responsive to flux switching and/or accept a current input configured to drive rotor 750'.

In an exemplary embodiment, rotor 750' comprises magnets 754' and flux concentrators 752'. In this configuration, at least a portion of flux from magnets 754' leaks between adjacent flux concentrators 752' across the side of rotor 750' opposite stator 710', as illustrated by the arrows in FIG. 7F.

With reference now to FIG. 7G, in an exemplary embodiment rotor 750 of transverse flux machine 700 comprises extended magnets 754 and flux concentrators 752. As depicted, the flux leakage from a first flux concentrator 752 to a second flux concentrator 752 is reduced and/or eliminated, as the extended portions of extended magnets 754 at least partially "shield" and/or otherwise block and/or prevent the leakage of at least a portion of flux.

In various exemplary embodiments, principles of extended magnets may be combined with principles of stator tooth overlap. Additionally, in other exemplary embodiments, principles of extended magnets may be combined with principles of an overhung rotor and/or stator. Furthermore, in yet other exemplary embodiments, principles of extended magnets may be combined with principles of stator tooth overlap and principles of an overhung rotor and/or stator.

Figure 8A:
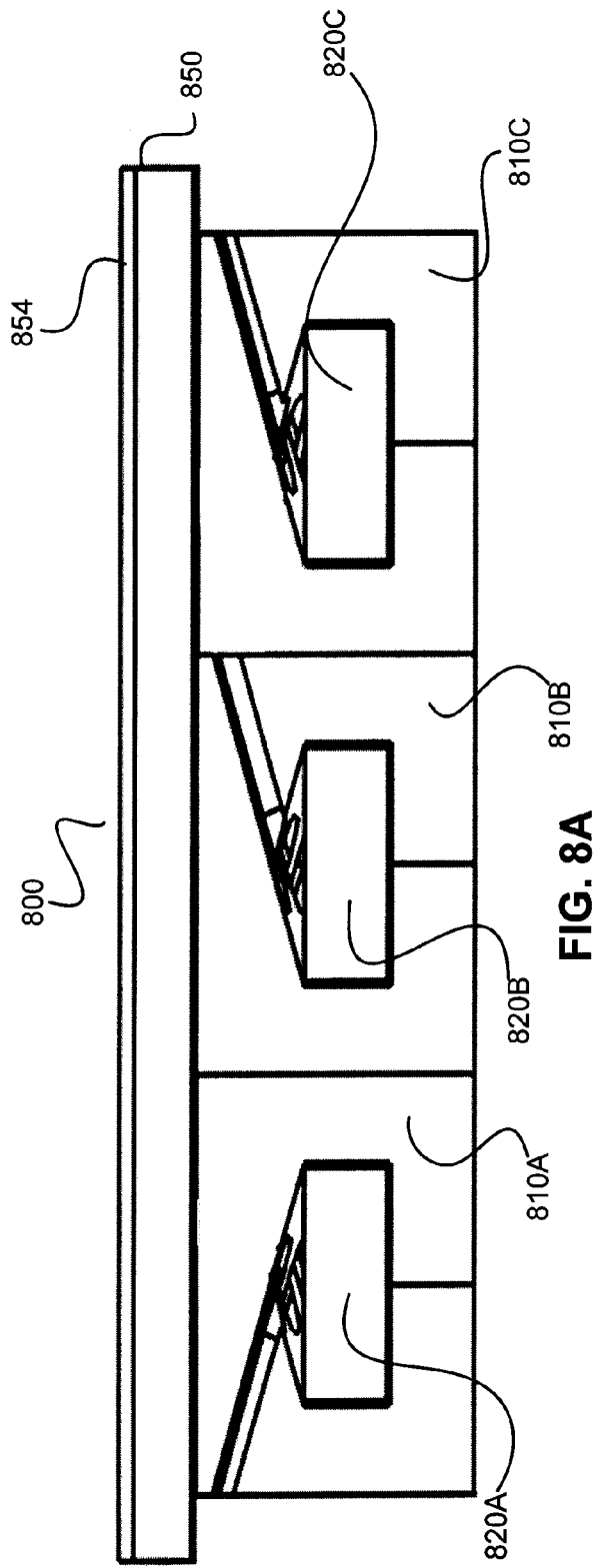
FIGS. 8A-8C illustrate, in cut-away views, an exemplary polyphase transverse flux machine configured with an overhung rotor, extended magnets, and stator tooth overlap in accordance with an exemplary embodiment.
Figure 8C:
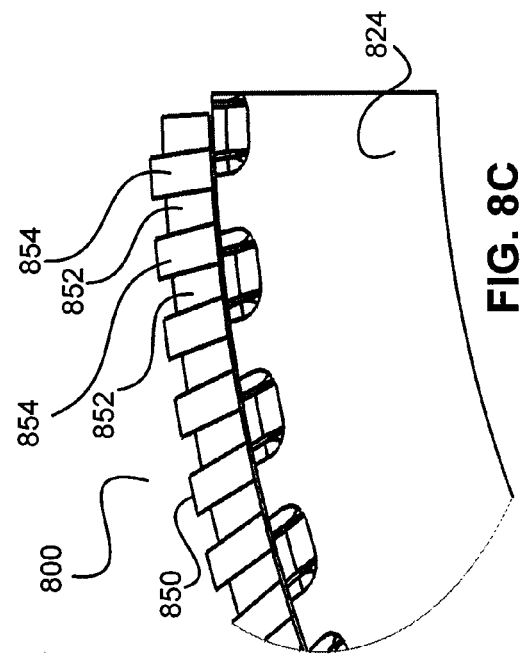
Figure 8B:
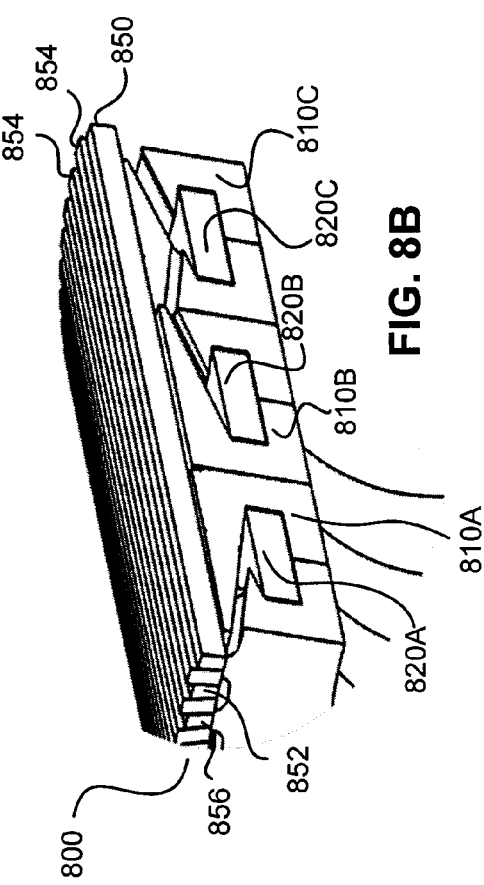

In an exemplary embodiment, with reference now to FIGS. 8A-8C, an electrical machine, for example polyphase device 800, generally comprises a rotor 850, a plurality of stators 810A, 810B, 810C, and plurality of coils 820A, 820B, 820C. Coils 820A, 820B, 820C are similar to previously described coil 420 and stators 810A, 810B, 810C are similar to stator 510. Rotor 850 is similar to previously described rotor 650 and/or 750.

In general, certain exemplary polyphase devices may be constructed by combining, linking, and/or otherwise utilizing and/or including suitable elements of single-phase devices. In various exemplary embodiments, a polyphase design may be constructed by replicating one or more portions of a single-phase design. In an exemplary embodiment, polyphase device 800 comprises three stators 810A, 810B, 810C and rotor 850 placed concentrically around a common axis of rotation. Coils 820A, 820B, 820C are typically oriented circumferentially about the center of polyphase device 800. Generally, coils 820A, 820B, 820C are fixed to the corresponding stator and thus do not rotate with rotor 850.

Multiple magnet portions are located on rotor 850. For example, rotor 850 may comprise a pattern of alternating magnets 854 and flux concentrators 852. This pattern may be repeated about the circumference of rotor 850 so as to at least partially form the shape of rotor 850.

In various exemplary embodiments, polyphase device 800 may be configured with one or more of overhung rotors, overlapped stator teeth, and/or extended magnets (or extended flux leakage blockers) as previously described herein. In one exemplary embodiment, each of the three stators (e.g. stators 810A, 810B, 810C) and respective coils 820A, 820B, 820C are configured to differ in phase.

In an exemplary embodiment, polyphase device 800 may be operated as an electrical output device. In these configurations, polyphase device 800 generates an alternating electrical output (for example, a substantially sinusoidal output) in corresponding coils 820A, 820B, 820C responsive to rotation of rotor 850. The electrical output of each coil 820A, 820B, 820C may have a phase that is shifted by a phase lag relative to each of the other coils (alternatively, advanced relative to each of the other coils).

In an exemplary embodiment, rotor 850 is overhung with respect to each of stators 810A, 810B, and 810C. As further described below, the length of the overhang of the rotor 850 with respect to a side of the "outside" stators (e.g., stators 810A and 810C) may be a function of a desired substantially matched back EMF waveform (and/or desired substantially matched voltage constant) between phases of polyphase device 800.

Figure 8D:
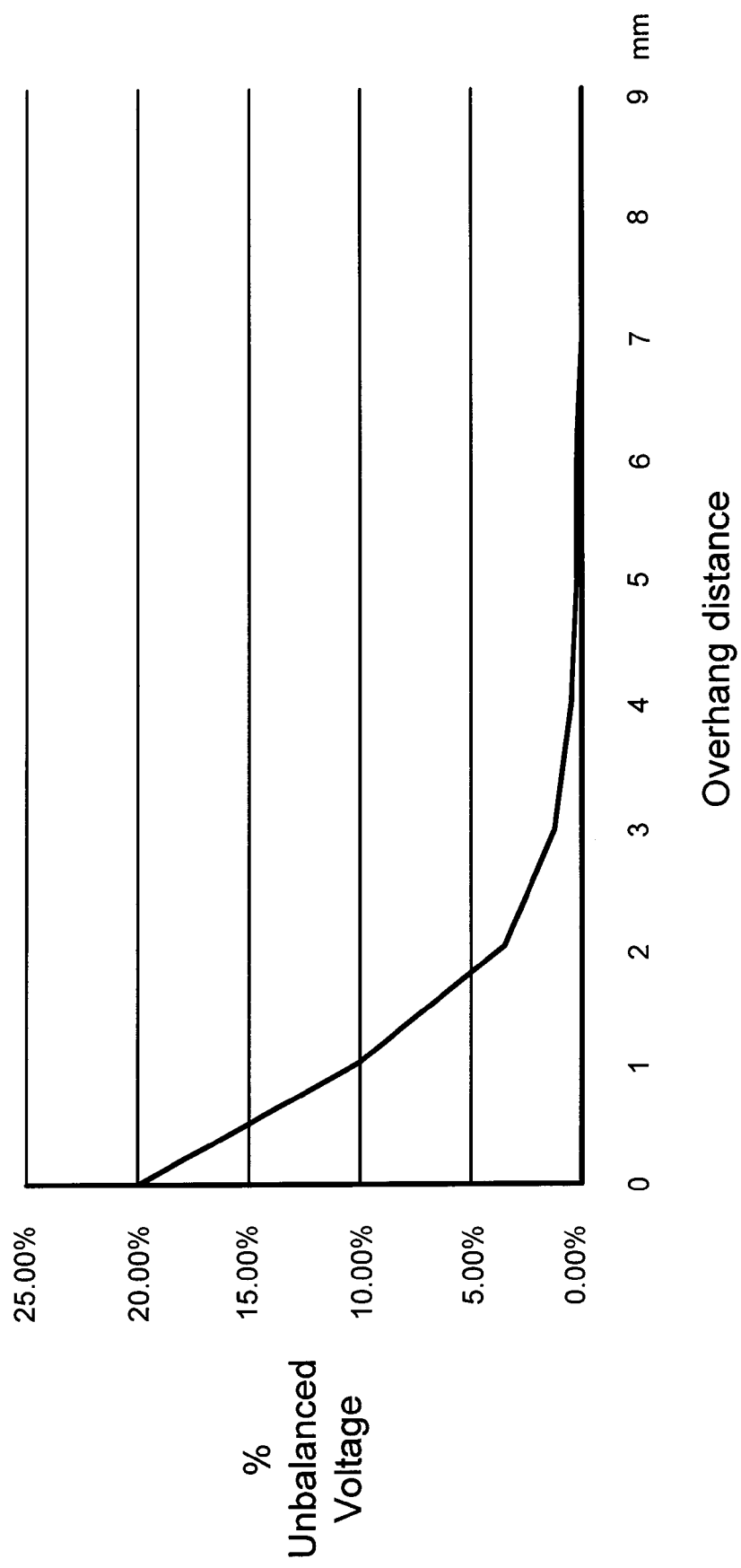
FIG. 8D illustrates an exemplary relationship between rotor overhang distance and unbalanced voltage between phases in an exemplary polyphase transverse flux machine in accordance with an exemplary embodiment.

Without an overhung rotor, typically polyphase device 800 would have unbalanced input and/or output between the individual phases. In other words, coils 820A and 820C, which are located on the "outside" of polyphase device 800, would often have lower voltage than coil 820B which is located in the "center" of polyphase device 800. In various exemplary embodiments and with reference to FIG. 8D, a modeled voltage in adjacent coils 820 of polyphase device 800 may be more closely balanced as rotor 850 is progressively overhung an increasing distance. In general, as the overhang distance of rotor 850 over the edge of stators 810A and 810C is increased, the degree to which voltages in coils 820A, 820B, and 820C are unbalanced is decreased. In an exemplary embodiment, the unbalanced voltage is an inverse function of the thickness of magnets 854 and/or flux concentrators 852. Thus, in an exemplary embodiment, polyphase device 800 may be configured to have a greater length of rotor overhang as the thickness of magnets 854 and/or flux concentrators 852 decreases. Moreover, voltage variation among phases may be configured to be a function of a varying air gap between rotor 850 and stators 810A, 810B, and 810C.

Figure 8E:
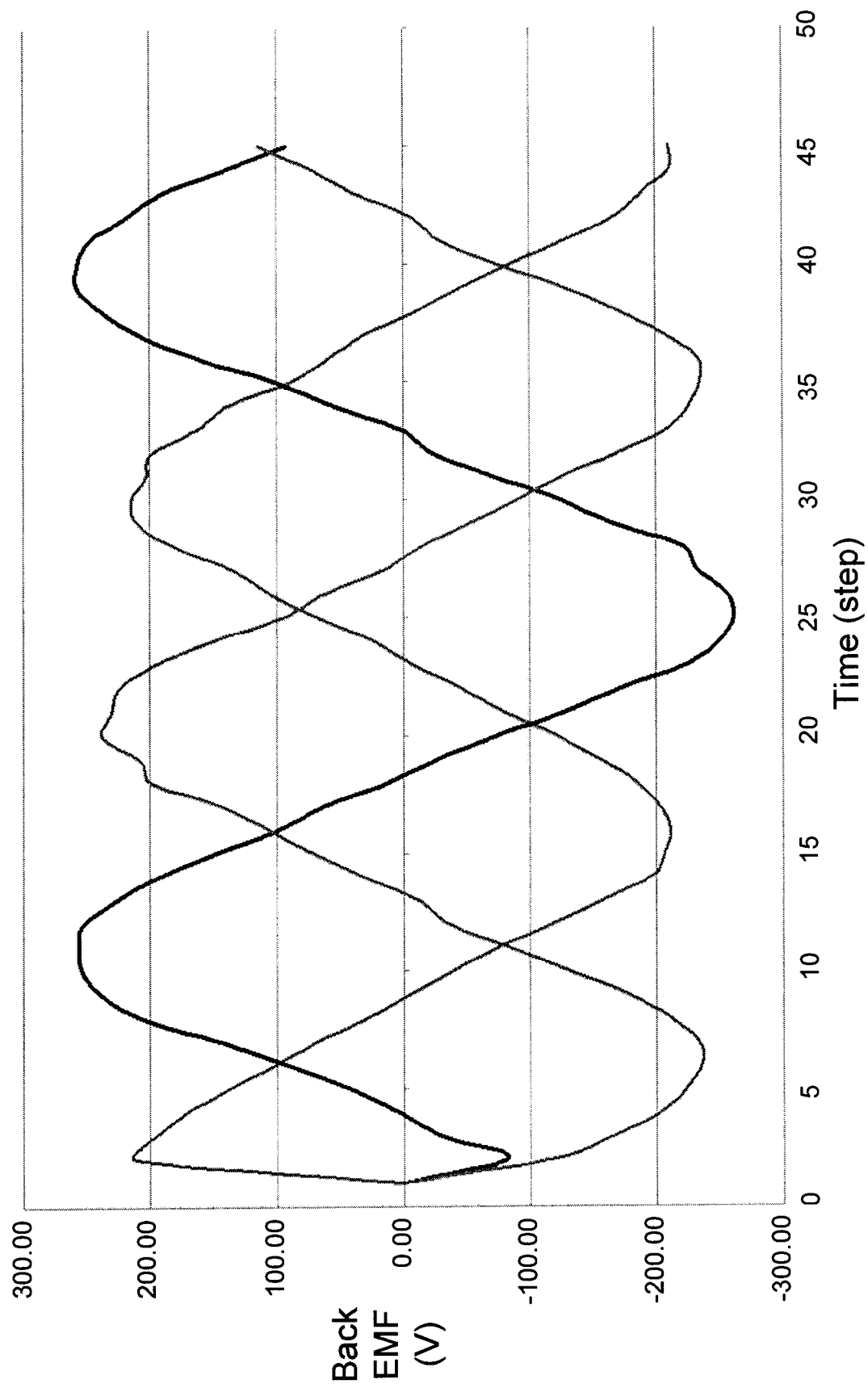
FIG. 8E illustrates exemplary back EMF waveforms in an exemplary polyphase transverse flux machine lacking an overhung rotor in accordance with an exemplary embodiment.

With reference now to FIG. 8E, in accordance with an exemplary embodiment, back EMF waveforms of an exemplary three-phase device lacking rotor overhang are illustrated. In general, the peak magnitude of the back EMF waveform associated with each phase is not equal. For instance, the peak back EMF magnitude in the center phase (as shown in bold) is about 5% higher to about 17% higher than peak back EMF magnitude in the other two phases. This performance mismatch between the phases can lead to various operational drawbacks, including higher torque ripple and/or higher cogging torque.

Figure 8F:
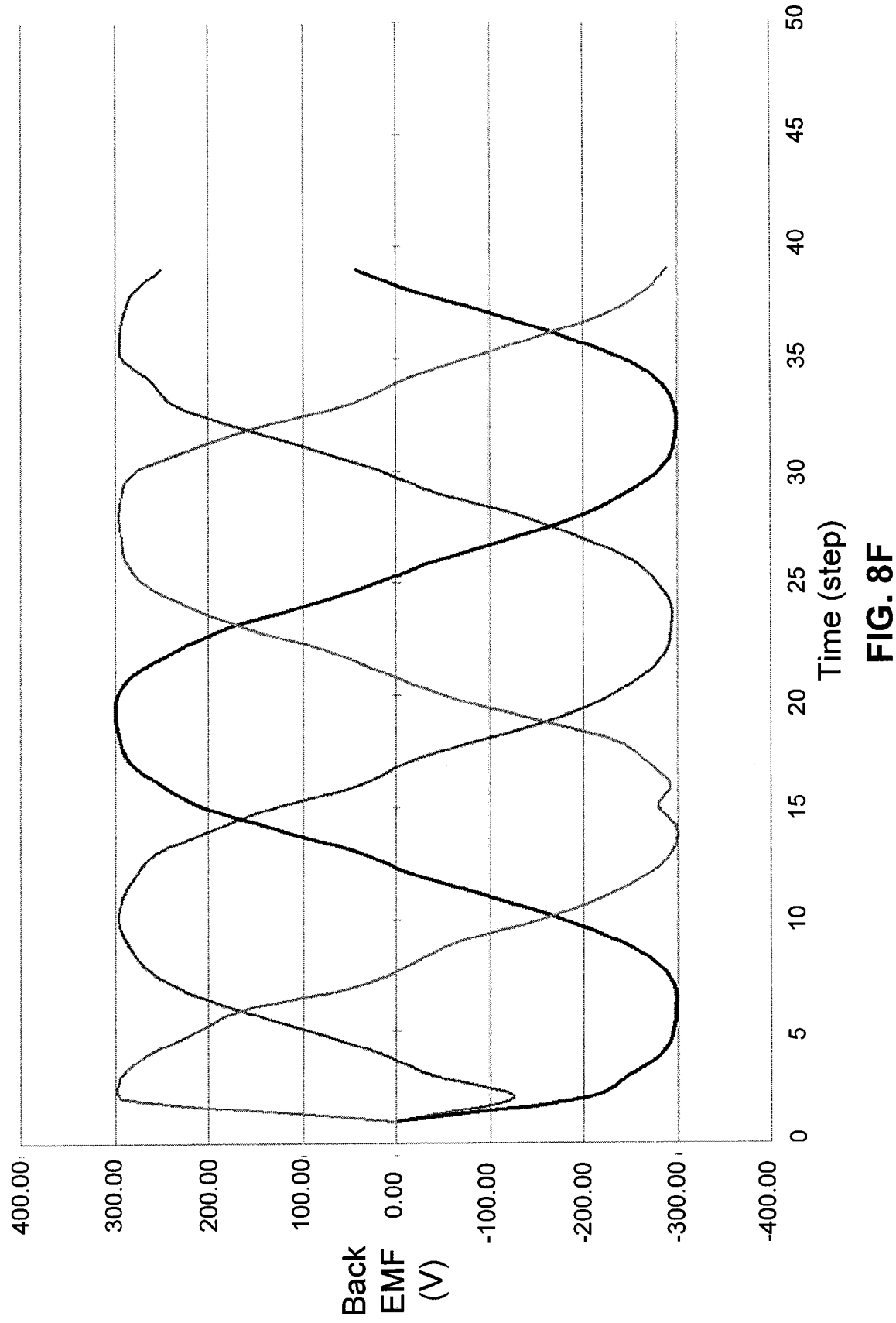
FIG. 8F illustrates exemplary back EMF waveforms in an exemplary polyphase transverse flux machine configured with an overhung rotor in accordance with an exemplary embodiment.

In contrast, in accordance with an exemplary embodiment and with reference to FIG. 8F, back EMF waveforms of exemplary polyphase device 800 configured with rotor overhang are illustrated. In general, the peak magnitudes of the back EMF waveforms of the three phases in polyphase device 800 are substantially equal. A more balanced voltage constant and/or back EMF waveform causes each phase to contribute torque more equally. This helps to reduce cogging torque and/or torque ripple in polyphase device 800.

Via use of such balanced polyphase configurations, transverse and/or commutated flux machines can achieve improved performance, higher and/or substantially equivalent voltage constants, and/or increased efficiency.

Various principles of the present disclosure may be practiced in multiple configurations and/or combinations. For example, extended magnets may be applied in various configurations. In an exemplary embodiment and with reference to FIGS. 9A and 9C, an electrical machine, for example transverse flux machines 900A and 900C, generally comprises a rotor (e.g., rotors 950A, 950C), a stator (e.g., stators 910A, 910C), and a coil (e.g. coils 920A, 920C). Coil 920A is similar to previously described coil 720 and stator 910A is similar to stator 710. Rotor 950A is similar to previously described rotor 750. Coil 920C is similar to previously described coil 720 and stator 910C is similar to stator 710. Rotor 950C is similar to previously described rotor portion 750. In an exemplary embodiment, and with reference to FIG. 9A, rotor 950A is cavity engaged with respect to stator 910A. In this embodiment, extended magnets 954A are shown to be extended in a direction orthogonal to the axis of rotation, but in an interior direction (i.e., in a direction toward the axis of rotation). In another exemplary embodiment and with reference to FIG. 9C, rotor 950C is face engaged with respect to stator 910C. The extended magnets 954C in transverse flux machine 900C are shown to be extended in a direction away from the exterior surface of rotor 950C and orthogonal to the axis of rotation of rotor 950C. Furthermore, in this embodiment, extended magnets may also be utilized on additional sides (e.g. sides parallel to the axis of rotation) of rotor 950C to reduce the leakage of flux on those sides.

In another exemplary embodiment and with reference to FIG. 9B, an electrical machine, for example commutated flux machine 900B, generally comprises a rotor 950B, a stator 910B, and a coil 920B. Stator 910B comprises interleaved extended magnets 914 and flux concentrators 912. Extended magnets 914 generally extend in one or more directions away from coil 920B. The top surface of extended magnet 914 may be a constant height across its surface from stator 910B or it may vary across its surface from stator 910B. In one exemplary embodiment, the top surface of extended magnet 914 may be substantially flat. In another exemplary embodiment, the top surface of each extended magnet 914 may have any suitable shape, such as curved, pointed, irregular, and/or the like. Moreover, extended magnet 914 may be configured with any suitable width.

In certain exemplary embodiments, in addition to reducing the leakage of flux, extended magnets may ease the assembly process of a rotor and/or stator. For instance, extended magnets may create a reference to align each magnet, such as with slots in a support member for precision of placement. Also, eddy currents may be decreased in an electrical machine comprising extended magnets 954. For instance, eddy currents in a rotor support may be reduced, as a smaller amount of flux is leaked. In one exemplary embodiment, total flux leakage in transverse flux machine 900C comprising extended magnets 954 is reduced by about 20% as compared to a similar transverse flux machine without extended magnets 954. In another exemplary embodiment, in transverse flux machine 900C comprising extended magnets 954, total flux leakage may be reduced from about 11 microwebers to about 8.5 microwebers as compared to a similar transverse flux machine without extended magnets 954.

Moreover, by utilizing extended magnets, the amount of flux leakage may be made more uniform. Stated another way, the peak flux leakage and the minimum flux leakage as a rotor rotates may be brought closer to one another.

Stators and/or rotors described herein may be coupled to other components, for example control electronics, guide mechanisms, cooling systems, and/or the like. In an exemplary embodiment, stator 910B further comprises a structural support that holds the magnets 914 and flux concentrators 912 for assembly and/or spacing. The structural support is designed to not interfere with the motion of the commutated flux machine 900B. In another exemplary embodiment, stator 910B further comprises cooling devices. The cooling devices may include radiative portions, conductive cooling portions, and/or the like. Furthermore, in various exemplary embodiments stator 910B comprises components configured to drive rotor 950B.

Principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of phase offset in transverse flux machines and/or commutated flux machines as disclosed in U.S. patent application Ser. No. 12/772,962 filed May 3, 2010, now U.S. patent application publication No. 2011/0169366 entitled "TRANSVERSE AND/OR COMMUTATED FLUX SYSTEM PHASE OFFSET", the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed on May 3, 2010, now U.S. patent application publication No. 2011/0169381 entitled "TRANSVERSE AND/OR COMMUTATED FLUX SYSTEMS FOR ELECTRIC BICYCLES", the contents of which are hereby incorporated by reference in their entirety.

Moreover, principles of the present disclosure may suitably be combined with any number of principles disclosed in any one of and/or all of the U.S. patent applications incorporated by reference herein. Thus, for example, a particular transverse flux machine and/or commutated flux machine may incorporate use of a phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

Moreover, certain exemplary embodiments described with reference to a commutated flux machine may be realized in a transverse flux machine, and vice versa. Certain exemplary embodiments described with reference to an axial gap configuration may be realized in a radial gap configuration, and vice versa. Certain exemplary embodiments described with reference to a face engaged configuration may be realized in a cavity engaged configuration, and vice versa.

Thus, in accordance with principles of the present disclosure, a transverse and/or commutated flux machine may desirably be employed in various applications. For example, in an automotive application, a transverse and/or commutated flux machine may be utilized as a wheel hub motor, as a direct driveline motor, and/or the like. Moreover, in an exemplary embodiment having a sufficiently wide operational RPM range, particularly at lower RPMs, a transverse and/or commutated flux machine may be utilized in an automotive application without need for a transmission, gearbox, and/or similar mechanical components.

An exemplary electric or hybrid vehicle embodiment comprises a transverse flux machine and/or commutated flux machine for driving a wheel of the vehicle, wherein the vehicle does not comprise a transmission, gearbox, and/or similar mechanical component(s). In this exemplary embodiment, the electric or hybrid vehicle is significantly lighter than a similar vehicle comprising a transmission-like mechanical component. The reduced weight may facilitate an extended driving range as compared to a similar vehicle with a transmission-like mechanical component. Alternatively, weight saved by elimination of the gearbox allows for utilization of additional batteries for extended range. Moreover, weight saved by elimination of the gearbox allows for additional structural material for improved occupant safety. In general, a transverse flux machine and/or commutated flux machine having a broad RPM range of suitable efficiency and/or suitable output torque may desirably be utilized in a variety of applications where a direct-drive configuration is advantageous. For example, a transverse flux machine and/or commutated flux machine having an efficiency greater than 80% over an RPM range from only a few RPMs to about 2000 RPMs may be desirably employed in an automobile.

Moreover, an exemplary transmissionless electric or hybrid vehicle may have a higher overall efficiency. Stated otherwise, the exemplary vehicle may more efficiently utilize the power available in the batteries due to the improved efficiency resulting from the absence of a transmission-like component between the motor and the wheel of the vehicle. This, too, is configured to extend driving range and/or reduce the need for batteries.

In accordance with principles of the present disclosure, a high torque density commutated flux machine and/or transverse flux machine is also well suited for use in various applications, for example automotive applications. For example, a conventional electric motor may have a torque density of between about 0.5 to about 3 Newton-meters per kilogram. Additional techniques, for example active cooling, can enable a conventional electric motor to achieve a torque density of up to about 50 Newton-meters per kilogram. However, such techniques typically add significant additional system mass, complexity, bulk, and/or cost. Additionally, such conventional electric motors configured to produce comparatively high amounts of torque, for example the Siemens 1FW6 motor, are limited to comparatively low RPM operation, for example operation below 250 RPMs.

In contrast, in accordance with principles of the present disclosure, an exemplary passively cooled transverse flux machine and/or commutated flux machine may be configured with a continuous, thermally stable torque density in excess of 50 Newton-meters per kilogram. As used herein, "passively cooled" is generally understood to refer to systems without cooling components requiring power for operation, for example water pumps, oil pumps, cooling fans, and/or the like. Moreover, this exemplary transverse flux machine and/or commutated flux machine may be configured with a compact diameter, for example a diameter less than 14 inches. Another exemplary transverse flux machine and/or commutated flux machine may be configured with a continuous, thermally stable torque density in excess of 100 Newton-meters per kilogram and a diameter less than 20 inches. Accordingly, by utilizing various principles of the present disclosure, exemplary transverse flux machines and/or commutated flux machines may be sized and/or otherwise configured and/or shaped in a manner suitable for mounting as a wheel hub motor in an electric vehicle, because the transverse flux machine and/or commutated flux machine is significantly lighter and/or more compact than a conventional electric motor. In this manner, the unsprung weight of the resulting wheel/motor assembly can be reduced. This can improve vehicle handling and reduce the complexity and/or size of suspension components.

Moreover, in accordance with principles of the present disclosure, a transverse flux machine and/or commutated flux machine may desirably be utilized to provide mechanical output to relatively lightweight vehicles such as bicycles, scooters, motorcycles, quads, golf carts, or other vehicles. Additionally, a transverse flux machine and/or commutated flux machine may desirably be utilized in small engine applications, for example portable generators, power tools, and other electrical equipment. A transverse flux machine and/or commutated flux machine may desirably be utilized to provide mechanical output to propeller-driven devices, for example boats, airplanes, and/or the like. A transverse flux machine and/or commutated flux machine may also desirably be utilized in various machine tools, for example rotating spindles, tables configured to move large masses, and/or the like. In general, transverse flux machines and/or commutated flux machines may be utilized to provide electrical and/or mechanical input and/or output to and/or from any suitable devices.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An electrical machine, comprising:
   a stator; and
   a rotor comprising a plurality of magnets and a plurality of flux concentrators,
   wherein at least one of the plurality of magnets is extended a first distance in a first direction,
   wherein a flux concentrator adjacent the at least one of the plurality of magnets is extended a second distance in the first direction,
   wherein the first distance is greater than the second distance,
   wherein the rotor overhangs a side of the stator in a direction parallel to an air gap between the rotor and the stator, and
   wherein the electrical machine is at least one of a transverse flux machine or a commutated flux machine.

2. The electrical machine of claim 1, wherein the height Y of the extended portion of the one of the plurality of magnets is represented by the equation $Y>(G/2)$, and wherein G is the width of a gap between adjacent flux concentrators in the rotor.

3. The electrical machine of claim 1, wherein the overhung portion of the rotor is overhung by a length XL, and wherein XL has a value of between 1% and 20% of the length of the rotor in the axial direction.

4. An electrical machine, comprising:
   a plurality of magnets; and
   a plurality of flux concentrators interleaved with the plurality of magnets, wherein at least one of the plurality of magnets is extended a first distance in a first direction,
   wherein a flux concentrator adjacent the at least one of the plurality of magnets is extended a second distance in the first direction,
   wherein the first distance is greater than the second distance, and
   wherein the electrical machine is at least one of a transverse flux machine or a commutated flux machine.

5. The electrical machine of claim 4, wherein the extended magnet reduces flux leakage between an adjacent flux concentrator on a first side of the extended magnet and an adjacent flux concentrator on a second side of the extended magnet.

6. The electrical machine of claim 4, wherein the extended magnet reduces flux leakage between flux concentrators on opposite sides of the extended magnet.

7. The electrical machine of claim 4, wherein the first direction is away from a coil of the electrical machine.

8. The electrical machine of claim 4, wherein the first direction is toward the rotational axis of a rotor of the electrical machine.

9. The rotor of claim 4, wherein the first direction is away from the rotational axis of the rotor.

10. The rotor of claim 4, wherein the first direction is parallel to the rotational axis of the rotor.

11. The electrical machine of claim 4, wherein the first direction is parallel to an air gap between a rotor of the electrical machine and a stator of the electrical machine.

12. The electrical machine of claim 4, wherein the first direction is away from the flux switching side of the adjacent flux concentrator.

13. The electrical machine of claim 4, wherein the at least one of the plurality of magnets is extended a third distance in a second direction, wherein a flux concentrator adjacent the at least one of the plurality of magnets is extended a fourth distance in the second direction, and
  wherein the first distance is greater than the second distance, and
  wherein the first direction and the second direction are different.

14. The electrical machine of claim 4, wherein the electrical machine is configured to achieve a flux switching frequency in excess of 125 Hz at a physical RPM of less than 250 RPM.

15. An electrical machine, comprising:
  a stator; and
  a rotor, wherein the rotor overhangs a first side of the stator and a second side of the stator in a direction parallel to an air gap between the rotor and the stator, and
  wherein the electrical machine is at least one of a transverse flux machine or a commutated flux machine.

16. The electrical machine of claim 15, wherein the rotor comprises a plurality of magnets and a plurality of flux concentrators.

17. The electrical machine of claim 15, wherein the rotor overhangs a distance of between about 0.5 millimeters to about 10 millimeters beyond the side of the stator.

18. The electrical machine of claim 15, wherein the electrical machine is a polyphase device, and wherein the rotor overhangs the stator to at least partially balance the peak magnitude of voltage waveforms between phases in the polyphase device.

19. The electrical machine of claim 15, further comprising a Hall effect sensor coupled to the stator, wherein the Hall effect sensor is magnetically linked to at least a portion of the overhung portion of the rotor.

20. The electrical machine of claim 15, wherein at least one of the plurality of magnets is extended a first distance in a first direction,
  wherein a flux concentrator adjacent the at least one of the plurality of magnets is extended a second distance in the first direction, and
  wherein the first distance is greater than the second distance.

\* \* \* \* \*